United States Patent
Crawford

(10) Patent No.: US 12,004,028 B2
(45) Date of Patent: Jun. 4, 2024

(54) DISTRIBUTED PROCESSING FOR DETERMINING NETWORK PATHS

(71) Applicant: Vapor IO Inc., Austin, TX (US)

(72) Inventor: Colton Malone Crawford, Austin, TX (US)

(73) Assignee: Vapor IO Inc., Austin, TX (US)

( * ) Notice: Subject to any disclaimer, the term of this patent is extended or adjusted under 35 U.S.C. 154(b) by 0 days.

(21) Appl. No.: 17/956,714

(22) Filed: Sep. 29, 2022

(65) Prior Publication Data

US 2023/0090416 A1 Mar. 23, 2023

Related U.S. Application Data

(63) Continuation of application No. 17/167,293, filed on Feb. 4, 2021, now Pat. No. 11,490,299, which is a
(Continued)

(51) Int. Cl.
*H04W 36/00* (2009.01)
*G06F 16/27* (2019.01)
(Continued)

(52) U.S. Cl.
CPC ........ *H04W 36/0083* (2013.01); *G06F 16/27* (2019.01); *H04L 9/0643* (2013.01);
(Continued)

(58) Field of Classification Search
CPC ........ H04W 36/0083; H04W 36/00835; G06F 16/27; G06F 16/9024; H04L 9/0643;
(Continued)

(56) References Cited

U.S. PATENT DOCUMENTS

2018/0007604 A1 1/2018 Pillay-Esnault
2018/0084021 A1* 3/2018 Rubin ............... H04W 36/0033
(Continued)

OTHER PUBLICATIONS

Communication pursuant to Rules 70(2) and 70a(2) for related European Patent Application 20855511.0 dated May 10, 2023, 1 page.
(Continued)

*Primary Examiner* — Jung H Park

(74) *Attorney, Agent, or Firm* — Pillsbury Winthrop Shaw Pittman, LLP

(57) ABSTRACT

Provided is a process including: advertising a plurality of values corresponding to computing components to peer nodes of a peer-to-peer network; storing the plurality of values in a tamper-evident, distributed ledger; determining a target data center in the distributed computing environment, wherein the target data center performs computations based on data sent from a mobile computing device, and wherein the target data center executes a peer node of the peer-to-peer network; determining a network path that is linked to the target data center based on a distance to the target data center; and transferring a packet from the target data center, wherein the packet traverses the network path and comprises one or more computation results from the target data center.

38 Claims, 5 Drawing Sheets

Related U.S. Application Data continuation of application No. 16/545,734, filed on Aug. 20, 2019, now Pat. No. 10,945,166, which is a continuation-in-part of application No. 16/438,257, filed on Jun. 11, 2019, now Pat. No. 10,674,411, which is a continuation of application No. 15/882,484, filed on Jan. 29, 2018, now Pat. No. 10,362,517.

(60) Provisional application No. 62/482,835, filed on Apr. 7, 2017.

(51) Int. Cl.
| | | |
|---|---|---|
| *H04L 9/00* | (2022.01) | |
| *H04L 9/06* | (2006.01) | |
| *H04L 9/32* | (2006.01) | |
| *H04L 67/10* | (2022.01) | |
| *H04L 67/104* | (2022.01) | |
| *H04L 67/1061* | (2022.01) | |
| *H04L 67/12* | (2022.01) | |
| *H04L 67/146* | (2022.01) | |
| *H04L 67/148* | (2022.01) | |
| *H04L 67/52* | (2022.01) | |
| *H04L 69/40* | (2022.01) | |

(52) U.S. Cl.
CPC ............ *H04L 9/3236* (2013.01); *H04L 67/10* (2013.01); *H04L 67/104* (2013.01); *H04L 67/1065* (2013.01); *H04L 67/12* (2013.01); *H04L 67/146* (2013.01); *H04L 67/148* (2013.01); *H04L 67/52* (2022.05); *H04L 69/40* (2013.01); *H04L 9/50* (2022.05); *H04L 2209/80* (2013.01)

(58) Field of Classification Search
CPC ..... H04L 9/3236; H04L 67/10; H04L 67/104; H04L 67/1065; H04L 67/12; H04L 67/146; H04L 67/148; H04L 67/18; H04L 69/40; H04L 2209/38; H04L 2209/80; H04L 9/3239

See application file for complete search history.

(56) References Cited

U.S. PATENT DOCUMENTS

| | | | |
|---|---|---|---|
| 2018/0253451 A1* | 9/2018 | Callan | H04L 9/3239 |
| 2018/0255130 A1* | 9/2018 | Kozloski | H04L 9/3239 |
| 2019/0098602 A1* | 3/2019 | Costa | H04W 64/003 |

OTHER PUBLICATIONS

Partial Supplementary Search Report for related European Patent Application 20855511.0 dated Dec. 21, 2022, 22 pages.
Office Action for related Canadian Patent Application 3148698 dated Sep. 29, 2023, 7 pages.
Extended European Search Report for related European Patent Application 20855511.0 dated Apr. 21, 2023, 21 pages.
Elif, Ak, et al. "BCDN: A proof of concept model for blockchai ••aided CON orchestration and routing", Computer Networks, Elsevier, Amsterdam, NL, vol. 161, Jun. 20, 2019, pp. 162-171, XP085785768, ISSN: 1389-1286, DOI: 10.1016/J.COMNET.2019.06.018, 10 pages.
Hyperledger Fabric "fabric/ledger.md at a77b923f4b3228971 c07d5e08d0db64d4fbb8e87 hyperledger/ fabric • GitHub", Mar. 26, 2018 (Mar. 26, 2018), XP055604410, etrieved from the Internet: URL:https://github.com/hyperledger/fabric/blob/a77b923f4b3228971c07d5e08d0db64d4fbb8e87/docs/source/ledger/ledger.md, 12 pages.
Lee, Han et al., "Blockchain-Based Mobility Management for LTE and Beyond", Jul. 11, 2019 (Jul. 11, 2019), Advances in Databases and Information Systems; [Lecture Notes in Computer Science; Lect.Notes Computer], Springer International Publishing, Cham, pp. 36-49, XP047514167,ISBN: 978-3-319-1 0403-4, 14 pages.
Saravanan, Raju, et al., "Design and analysis of elastic handoff in cognitive cellular networks", 2017 IEEE International Conference on Communications (ICC), IEEE, May 21, 2017 (May 21, 2017), XP033132717, DOI: 10.1109/ICC.2017.7996835, 6 pages.

* cited by examiner

DISTRIBUTED PROCESSING FOR DETERMINING NETWORK PATHS

CROSS-REFERENCE TO RELATED APPLICATIONS

This application is a continuation of U.S. patent application Ser. No. 17/167,293, titled DISTRIBUTED PROCESSING FOR DETERMINING NETWORK PATHS, filed 4 Feb. 2021, now issued as U.S. Pat. No. 11,490,299, which is a continuation of U.S. patent application Ser. No. 16/545,734, titled DISTRIBUTED PROCESSING FOR DETERMINING NETWORK PATHS, filed 20 Aug. 2019, now issued as U.S. Pat. No. 10,945,166, which is a continuation-in-part of U.S. patent application Ser. No. 16/438,257, titled DISTRIBUTED HANDOFF-RELATED PROCESSING FOR WIRELESS NETWORKS, filed 11 Jun. 2019, now issued as U.S. Pat. No. 10,674,411, which is a continuation of U.S. patent application Ser. No. 15/882,484, titled DISTRIBUTED HANDOFF-RELATED PROCESSING FOR WIRELESS NETWORKS, filed 29 Jan. 2018, now issued as U.S. Pat. No. 10,362,517, which claims the benefit of U.S. Provisional Patent Application 62/482,835, titled BLOCK CHAIN AS A DISTRIBUTED ROUTING ENVIRONMENT FOR CONTRACT BASED HANDOFF, filed 7 Apr. 2017. The entire content of each afore-listed earlier-filed application is hereby incorporated by reference for all purposes.

BACKGROUND

1. Field

The present disclosure relates generally to edge-based computing and, more specifically, to distributed processing for determining network paths.

2. Description of the Related Art

In the coming years, it is expected that there will be a greater need for wirelessly accessible, relatively low-latency, relatively high-powered computing placed near the edge of networks. It is expected that various machine learning and other artificial intelligence algorithms will need to process relatively high-bandwidth (e.g., more than 1 Gb/s) streams of data to output results in real-time (e.g., within 200 ms, and in some cases, less than 50 ms) after that data is acquired. Examples include processing images (e.g., in video or range-finding camera output) and other sensor data gathered by self-driving cars, autonomous drones, wearable computing devices, and other packages of sensors that move throughout (or are static) geographic areas and respond to data gathered by the sensors in real time.

Often, the amount of computing power used when executing these algorithms on this type of data exceeds the amount of computing power available on the mobile computing device moving through geographic areas, such as on-board on a car, or battery-power constraints may warrant offloading even for static devices. In many cases, uploading this data to a traditional public cloud data center to process the data and to generate actionable commands or results is too slow, in part due to the amount of time taken to convey the data over relatively large geographic distances. This is due, in part, to the time consumed transmitting the data and results from the speed of light imposing limits on how fast information can be conveyed over large geographic distances. Additional delays arise from switching and routing equipment along the path and potential congestion.

Accordingly, it is expected that there will be a need to distribute relatively high-performance computing facilities, such as data centers, over distributed geographic areas. For example, distributing the data centers every few miles in a metropolitan area, county, state, or country, rather than relying exclusively upon data centers that are geographically concentrated and serve, for example, a continent from a single geographic location. (This is not to suggest that such geographically concentrated data centers may not also be used with the present techniques.)

Existing wireless networks and related computing infrastructure are not well-suited for enabling low latency, high-bandwidth edge-based computing. For example, traditional ways of handing off connections between cellular towers in many cellular wireless networks are too slow and impose too much overhead on the network to coordinate the handoffs in these types of use cases. Many systems rely on a relatively centralized authority (like a base station controller or a mobile switching center (which is not to suggest that use of such facilities for handoffs is disclaimed)) to determine which mobile wireless radio communicates with which cellular tower and coordinate handoffs between the cellular towers, for example, as a wireless radio moves geographically out of range of one tower and into range of another, or where a device is in range of multiple cellular towers. The problem is aggravated when handoffs are between different wireless network providers. The time taken in communicating with the central authorities by the base stations can consume too much of the latency budget for many real-time data processing use cases, impeding real-time computing at the edge of networks. This issue is particularly acute where there are large bandwidth requirements, as occurs in many artificial intelligence algorithms operating upon relatively high dimensional data, such as video feeds, light detection and ranging (LIDAR) feeds, ultrasonic depth sensors, and suites of signals from other sensors carried by mobile computing platforms.

SUMMARY

The following is a non-exhaustive listing of some aspects of the present techniques. These and other aspects are described in the following disclosure.

Some aspects include a process that includes using block chain as a distributed routing environment for contract based handoff to route streaming data to edge-based data centers.

Some aspects include a process that includes: obtaining, with one or more processors, a distributed-application address of a distributed handoff application, wherein: the distributed-application address is a cryptographic hash value that uniquely identifies the distributed handoff application among a plurality of distributed applications executable on peer nodes of a peer-to-peer network of computing devices; the distributed handoff application is accessible via one or more of the peer nodes identified by entries in a distributed hash table linked, directly or indirectly, via the distributed hash table, to a key value in the distributed hash table corresponding to the distributed-application address; the distributed handoff application executes on one or more peer nodes of the peer-to-peer network of computing devices; and the distributed handoff application comprises a distributed-handoff application program interface (API) by which handoff from one wireless base station to another wireless base station is coordinated at least in part by at least some of the peer nodes of the peer-to-peer network; calling, with one or more processors, the distributed-handoff API with a request to handoff a current wireless data session between a first base station and a mobile computing device to another base station, wherein: the request causes the distributed handoff application to determine one or more parameters of a handoff of the wireless data session from the first base station to a second base station, such that, after the handoff, the mobile computing device continues the wireless data session with the second base station; the determination causes the one or more parameters of the handoff of the wireless data session to be sent to both the mobile computing device and the second base station; and the determination causes a record of the second base station receiving the handoff to be stored in a tamper-evident, distributed ledger encoding records of a plurality of previous handoffs in a directed acyclic graph of cryptographic hash pointers; and receiving, with one or more processors, a result of the distributed-handoff API request and, in response, at least partially effectuating the handoff of the wireless data session from the first base station to the second base station.

Some aspects include a process that includes: advertising, with a computer system, a plurality of values corresponding to computing components to peer nodes of a peer-to-peer network; storing, with the computer system, the plurality of values in a tamper-evident, distributed ledger encoding records of a plurality of previous values in a directed acyclic graph of cryptographic hash pointers, wherein the tamper-evident, distributed ledger is stored on the peer-to-peer network; determining, with the computer system, a target data center in the distributed computing environment, wherein the target data center performs computations based on data sent from a mobile computing device, and wherein the target data center executes a peer node of the peer-to-peer network; determining, with the computer system, a network path that is linked to the target data center based on a distance to the target data center, wherein the distance value is determined based on from the plurality of values stored in the tamper-evident, distributed ledger; and transferring, with the computer system, a packet from the target data center, wherein the packet traverses the network path and comprises one or more computation results from the target data center.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
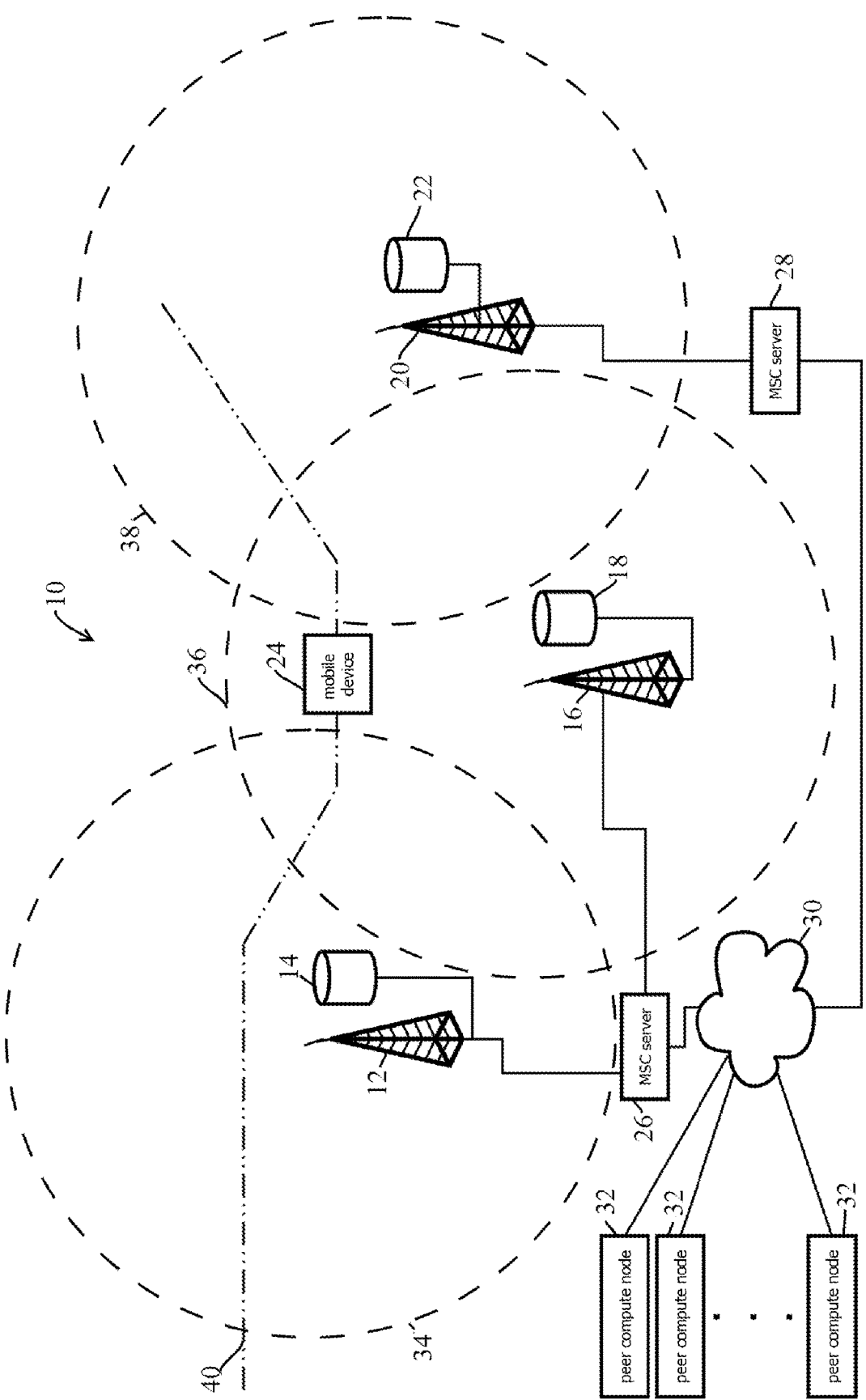
FIG. 1 is a schematic diagram of a computing environment in which various networks in accordance with the present techniques may be implemented in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of self-driving cars, artificial intelligence, and wireless networking. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 shows an example of a wireless network and distributed edge-based computing environment that, in some embodiments, may mitigate some of the above-described problems. Some embodiments may leverage block chain technology to implement a distributed routing environment that provides contract-based handoff between different cellular towers or other wireless base stations (e.g., wireless access points). In some embodiments, these base stations may contain wired connections to the Internet and between one another. The base stations may serve, for example, as access points on cellular or Wi-Fi™ networks for collections of mobile computing devices within wireless range of the respective base stations (e.g., in wireless ad hoc or centrally managed mesh networks). In some embodiments, each of these base stations may be collocated with, or geographically proximate to (for example, within 1 or 10 km), an edge-located data center, for example, a collection of rack-mounted computing devices disposed within the chambers and communicating with one another using the techniques described in the following patent applications (listed by filing date, US patent application number, and title), the contents of which are hereby incorporated by reference:

| Mar. 9, 2016 | 15/065,201 | COOLING SYSTEM FOR DATA CENTER RACK |
| Mar. 9, 2016 | 15/065,212 | OUT-OF-BAND DATA CENTER MANAGEMENT VIA POWER BUS |
| Mar. 9, 2016 | 15/065,224 | PATCH PANEL FOR QSFP + CABLE |
| Mar. 9, 2016 | 15/065,181 | RACK FOR COMPUTING EQUIPMENT |
| May 26, 2016 | 15/165,590 | ADAPTERS FOR RACK-MOUNTED COMPUTING EQUIPMENT |
| May 31, 2016 | 62/343,252 | AUTONOMOUS DISTRIBUTED WORKLOAD AND INFRASTRUCTURE SCHEDULING |
| Jul. 1, 2016 | 15/200,961 | COMPACT UNINTERUPTABLE POWER SUPPLY |
| Jul. 25, 2016 | 15/218,650 | RACK FOR COMPUTING EQUIPMENT |
| Sep. 6, 2016 | 15/257,105 | BUS BAR POWER ADAPTER FOR AC-INPUT, HOT-SWAP POWER SUPPLIES |
| Oct. 28, 2016 | 15/337,732 | SENSING LOCATION OF RACK COMPONENTS |
| Oct. 30, 2016 | 15/338,402 | HOT-PLUGGABLE CONNECTION FOR DATA COMMUNICATIONS |
| Nov. 28, 2016 | 15/362,025 | RACK FOR COMPUTING EQUIPMENT |
| Dec. 1, 2016 | 15/366,554 | DATA CENTER MANAGEMENT |
| Dec. 1, 2016 | 15/366,528 | DATA CENTER MANAGEMENT |
| Jan. 6, 2017 | 15/400,648 | DATA CENTER MANAGMENT VIA OUT-OF-BAND, LOW-PIN COUNT, EXTERNAL ACCESS TO LOCAL MOTHERBOARD MONITORING AND CONTROL |

In some embodiments, as a mobile computing device moves through a geographic area, into range of some of the base stations in that area and out of range of other base stations in that area, the mobile computing device may gather data with a set of sensors, like cameras, LIDAR, radar, ultrasonic range finding, inertial measurement unit readings, satellite navigation sensors, or dead reckoning based on measured wheel rotations, compasses, and the like. In some embodiments, the mobile computing device may transmit data gathered by the sensors wirelessly to one of the above-described base stations, such as a cellular tower within range. An edge-based data center may be associated with the respective base station. The respective edge-based data center may ingest this streamed data; apply various artificial intelligence, such as machine learning, algorithms; and output a response back to the mobile computing device via the wireless network.

In some embodiments, this response to the streamed data may be sent in real time, for instance, within less than 100 ms of when the data was gathered, for example, within less than 50 ms or less than 10 ms of when the data is gathered. In some cases, the volume of data streamed may be relatively large, for example exceeding 1 Gb per second, and in some cases, exceeding 10 Gb per second, depending upon how many sensors are in use and the type of sensor.

In some embodiments, the mobile computing device may receive this result and take responsive action. For example, embodiments may receive a result of the edge-based data center classifying an object in the field of view of the mobile computing device's camera (such as a depth-sensing imaging device) as a person. In response, the mobile computing device may adjust a steering direction of a self-driving car to avoid the person or apply brakes to stop before hitting the person. In some cases, a variety of other responsive actions may be taken, including determining to adjust a speed or direction of steering to maintain a target position along a route, for example, within a particular lane on the road. Other examples include classifying an upcoming turn as corresponding to a turn along a targeted route, classifying other objects as corresponding to other motor vehicles within the field of view of the camera, or the like and avoiding those other objects, among many tasks that may be performed.

Some embodiments may make similar classifications at edge-based data centers responsive to data gathered by other types of static or mobile Internet of things appliances. For instance, embodiments may receive a video feed stream (or audio stream, or three-dimensional range finding stream) from a plurality of cameras in a house and classify moving objects as corresponding to authorized residents or an intruder. Or embodiments may ingest an audio feed from a microphone on such an appliance and perform speech-to-text conversion.

In some embodiments, this distributed system may execute a distributed algorithm implementing ad hoc distributed routing of communication between the mobile computing device and the various base stations, such as cellular towers along a route driven by a self-driving car or flown by an autonomous drone.

To this end or others, in some embodiments, the mobile computing device may include a geolocation sensor, such as a global positioning system or GLONASS sensor, operative to sense a geolocation of the mobile computing device based on timing signals in beacons transmitted by arrays of satellites received by the sensor. In some cases, the mobile computing device may output a latitude, longitude, altitude, and confidence radius or sphere.

Further, in some cases, the mobile computing device may include a radio configured to wirelessly communicate with the above-described base stations, such as cellular towers along a route navigated by an autonomous drone or self-driving car. In some embodiments, the radio may be configured to sense identifiers broadcast by these base stations and measure (and associate with the identifiers) a signal strength of signals from these base stations, such as a received signal strength indicator (RSSI), a signal-to-noise ratio (SNR), or a signal to interference and noise ratio (SINR).

In some embodiments, the location of the mobile computing device, as sensed by the geolocation sensor, the list of base stations, and measures of signal strength of those base stations may be transmitted by the radio of the mobile computing device to base stations within range of the mobile computing device, for example, periodically in a beacon, like every 10 ms or more or less frequently. In some embodiments, the base stations may include corresponding radios that receive these beacons, along with an identifier of the mobile computing device that distinguishes the mobile computing device from other mobile computing devices configured to wirelessly access a network provided by a collection of base stations. In some embodiments, this information may be embedded in a field of a header in a beacon or packet transmitted on such a network.

In some embodiments, the base stations may communicate between themselves via a wired or wireless network to determine which base station will wirelessly communicate with the mobile computing device and effectuate handoffs between base stations when the mobile computing device moves geographically between areas where one base station is more suitable to a different geolocation where another base station is more suitable. For example, handoffs may be based on the base stations having different signal strengths as perceived by the mobile computing device, load supported by those respective base stations, interference with signals from the respective base stations experienced by the mobile computing device, or a combination thereof.

In some embodiments, the base stations may make handoff determinations independently of a central authority, such as without the handoff being fully controlled or controlled at all, depending upon the embodiment, by a central authority that manages handoff between 5 or 10 or more cellular towers. As a result, some embodiments may effectuate handoffs relatively quickly, without delays while information is sent to a central authority, processed by the central authority, and sent back to the base stations. Further, some embodiments may avoid relatively high communication overhead in networks in which a single central authority manages a relatively large number of base stations over a large geographic region.

In some embodiments, the mobile computing device may broadcast packets, such as Internet Protocol packets, addressed to a receiving Internet Protocol (IP) address. And in some embodiments, the different base stations may assign this IP address to the base station selected to communicate wirelessly with the mobile computing device using the techniques discussed above. For example, a given IP address may travel with the mobile computing device across a metropolitan area, causing packets sent by the mobile computing device to go to different base stations at different times based upon which base station has claimed that IP address, based on the location and signal strength indicated by the mobile computing device at the different times, and as memorialized and determined based on a block chain ledger. And packets may be routed from other entities through the network to the IP address of the mobile device via different base stations based on reference to such a ledger.

In some embodiments, the mobile computing device may include directional antennas that are reoriented based on a base station chosen to communicate with the mobile computing device. For example, upon two base stations communicating between themselves to determine which will communicate with the mobile computing device, a resulting chosen base station may send an identifier and an indication of the result of the determination back to the mobile computing device. In some embodiments, the mobile computing device may access a repository of geolocations of base stations stored in memory of the mobile computing device, or retrieve geolocations of the base stations via the wireless network noted above. In some embodiments, the mobile computing device may determine a location of the mobile computing device and a location of the selected base station and point a directional antenna of the mobile computing device at the selected base station (e.g., by changing an angular targeted set point of an actuator to rotate an antenna array). In some embodiments, the local computing device may maintain alternate sets of antennas used during handoffs. In some cases, one directional antenna may be reoriented towards an upcoming base station to be selected next, while a currently used directional antenna is oriented towards a base station currently supporting wireless connection with the mobile computing device.

In some embodiments, as the mobile computing device moves through a geographic region, a set of one or more localized micro zones may be created in the geographic area within wireless range of the mobile computing device, dynamically via the signal strength indication and geolocation, according to an IP address handoff to base stations that manage communication in the micro zone. In some embodiments, the mobile computing device may broadcast data gathered by sensors carried by the mobile computing device to the same IP address. That data gathered by the sensors may be received by the assigned base station, advanced by that base station to an edge-based data center associated therewith, and processed and responded to with the techniques described above.

In some embodiments, contract-based handoff may be implemented with a relatively low-latency block chain implementation, for example, based on the Hyperledger™ digital crypto ledger. In some cases, some embodiments may omit proof of work and proof of stake functions to expedite operations (or some embodiments may include these features, which is not to suggest that other features described herein may not also be omitted in some cases). In some embodiments, wireless base stations within range of a mobile computing device, or within a geographic area, may arrive at a consensus as to which base station will communicate with the mobile computing device based on an implementation of the Raft consensus protocol, for example, by implementing Byzantine fault tolerance. In some cases, the consensus protocol may be that described by the following paper available at raft.githumb.io and incorporated by reference: Ongaro, Diego; Ousterhout, John (2014), "In Search of an Understandable Consensus Algorithm (Extended Version)." Some embodiments may implement an implementation of the Paxos consensus algorithm or other type of consensus algorithm. Some embodiments may implement the "HotStuff consensus protocol described in a paper titled HotStuff: BFT Consensus in the Lens of Blockchain" by Yin et. al., arXiv:1803.05069v5.

In some embodiments, wireless base stations may include computing devices that implement the functionality described herein. In some embodiments, to arrive at a consensus on handoff (or handoff and program state, or just program state, for a dynamic federated cluster that moves with the mobile computing device onto different edge-based data centers associated with base stations designated to communicate with the mobile computing device) the wireless base stations may elect a leader, and upon an elected leader failing, elect another leader. In some embodiments, some of the wireless base stations may be designated as a candidate or a follower, depending upon role. In some embodiments, an elected leader may periodically send a heartbeat message, for example, via a wired backhaul or crosshaul network (e.g., a network that serves the function of a backhaul network but without a central authority assigning roles to base stations and with the base stations determining roles with peer-to-peer communications in a distributed algorithm) connected to the Internet, to other base stations in the same cluster. For example, base stations in the same geographic region or in wireless range of the mobile computing device. In some cases, upon other computing devices in other base stations determining that a heartbeat has not been received within a threshold amount of time, some embodiments may initiate a new leader election. In some cases, leaders may be elected and consensus may be reached with the techniques described in U.S. patent application Ser. No. 15/366,528, filed Ser. No. 15/366,528, titled DATA CENTER MANAGEMENT, the contents of which are hereby incorporated by reference.

In some cases, the edge-based data centers associated with the various base stations may execute various distributed training streaming platforms, such as Apache Kafka™, that process streaming data from the mobile computing devices, for instance, received an association with IP addresses claimed by the base stations using the techniques described above, as a mobile computing device moves into wireless range of the base station. Some embodiments may implement various real-time complex event processing systems as well, for example Apache Flink™ or Apache Spark™.

In some cases, the edge-based data centers may include a plurality of tenants corresponding to public cloud providers. API requests may be routed within the edge-based data centers to computing devices (or virtual machines) associated with those public cloud providers and hosted within the respective edge-based data center, for example, based upon virtual machines or computing devices indicated in network requests.

Some embodiments may further construct dynamic cluster federations on these edge-based data centers, for example with Kubernetes™ kubefed functionality. Some embodiments may process streaming data within resulting dynamic cluster federations, for instance, that travel with the mobile computing device to different edge-based data centers associated with different base stations, in some cases, receiving and subscribing to data routed to the same IP address by the mobile computing device, without regard to which base station is being communicated with. Some embodiments may implement serverless functions, e.g., on unikernels, that are stateless and are instantiated and spun down on a given edge-based data center to provide corresponding functionality to a mobile computing device as the mobile computing device moves through an area served by the edge-based data center. Thus, some embodiments may avoid additional delay resulting from round-trip exchanges with a domain name service to map, for example, Uniform Resource Identifiers (URIs) to Internet protocol addresses, or to convey an updated IP address to the mobile computing device each time a handoff occurs.

In some cases, the blockchain functionality referenced above may implement handoffs according to smart contracts implemented on the blockchain. In some cases, the smart contract may encode a set of criteria by which pairwise combinations of base stations within wireless range of a mobile computing device negotiate and commit to a handoff decision, in some cases, even across different networks of base stations operated by different entities. For example, a pair of base stations may both receive a beacon from a mobile computing device indicating a set of base stations detected by the mobile computing device's radio, measurements of signal strengths for those base stations (including the pair) perceived at the mobile computing device by its radio, and a geolocation of the mobile computing device (and in some cases, a velocity and route of the mobile computing device). The base stations may negotiate and enforce a contract based on this gathered data and, for example, amounts of available bandwidth at the base stations (or predicted amounts available based on routes of other mobile computing devices). In some cases, the smart contract may be memorialized within the blockchain, along with offers, counter offers, and acceptance algorithmically submitted to the block-chain ledger.

Various protocols and applications may be implemented using media access control and routing techniques, like those described above. Examples include traditional web traffic over TCP/IP. Other examples include multipath TCP traffic and UDP traffic. Some embodiments may implement peer-to-peer protocols for various functions (like data storage, messaging, consensus determinations, elastically scaling resources, orchestrating containers/unikernels/virtual machines, workflow management, and message routing), like Interplanetary File System (IPFS)™, BitTorrent™, and various other mesh networks, such as those implementing peer addressing with various types of distributed hash tables, like CAN, Chord, Pastry, or Tapestry. Thus, some embodiments provide an intelligent wired or wireless mesh routing environment to enable contract based service activation/handoff to implement these various protocols, related services, and related applications.

In some cases, some or all of the above-describe techniques may be implemented in a computing environment 10 shown in FIG. 1. In some embodiments, the computing environment 10 may span a geographic area, such as a geographic area having several base stations and edge-based data centers, like base stations 12, 16, and 20, and edge-based data centers 14, 18, and 22. Three pairs of base stations and edge-based data centers are shown, but commercial implementations are expected to include substantially more, for instance, more than 1000, more than 10,000, or more than 50,000 such pairs. In some cases, the pairs of base stations and data centers may be distributed over a geographic area, for instance, regularly arrayed in order to provide wireless coverage and low-latency processing over more than 10 mi.$^2$, 1000 mi.$^2$, the entire United States, North America, or the world.

The base stations 12, 16, and 20 may each have regions of coverage for wireless data (e.g., voice or nonvoice data signals), corresponding to regions 34, 36, and 38 respectively. In some embodiments, a mobile computing device 24 may move among these various regions, for instance, along a route 40. The mobile computing device 24 may be a mobile handset, a tablet computer, a laptop, a self-driving automobile, such as a level III or higher self-driving automobile, an autonomous drone, or the like. In some cases, the role of the mobile computing device 24 may be filled by a computing device that is nonmobile, for instance by various in-home or in-business computing appliances with a need to offload computing tasks to the data centers 14, 18, and 22. The static computing tasks may be things like a home security systems needing to offload image recognition tasks, smart speakers needing to offload audio classification and speech to text tasks, home automation appliances responding to environmental queues, and the like.

In the illustrated example, each base station 12, 16, and 20 is paired with a different data center 14, 18, and 22. But other embodiments may have a different ratio, which is not to suggest that any other description herein is limiting. In some embodiments, the edge-based data centers 14, 18, or 22 may each serve a plurality of base stations. For instance, embodiments may include some base stations that share a baseband controller and are located some distance away from one another, such as more than 100 meters or more away from one another, with overlapping coverage. In some cases, the shared baseband controller may interface with each of the base stations it controls and cooperate with the below-described mobile switching controller servers to route network connections via the respective ones of the base stations. For instance, a given baseband controller may control two, four, eight, or sixteen different base stations. In some cases, the baseband controller may form a crosshaul network by which calls are routed. In some cases, each baseband controller may be associated with a respective edge-based data center, and that edge-based data center may be shared by a number of base stations controlled by the respective baseband controller, such as less than 32 base stations.

In some embodiments, the illustrated edge-based data centers 14, 18, and 22 may be physically proximate the base station or base station controller with which they are associated. In some embodiments, each edge-based data center may be located within 1 km, within 10 km, or may be integrated with, for example in a single physical site the respective base stations or baseband controllers. In some embodiments, the edge-based data centers may be formed within the same enclosure as the respective baseband controllers, located within the same perimeter fence as the respective baseband controllers or base stations, or otherwise be closely positioned. In some embodiments, the edge-based data centers 14, 18, and 22 may share various facilities with the respective base station or baseband controller, for example, power, network connections, heating, air conditioning, air circulation, physical buildings, concrete pads, and the like. In some embodiments, the edge-based data centers 14, 18, and 22 may be on a private local area network with their respective base station or baseband controller, for instance, connected by a relatively high-bandwidth optical or wired connection.

In some embodiments, the edge-based data centers may each be one of the chambers in the various references incorporated by reference above, for instance, having a plurality of racks arranged around a central cooling passage. In other cases, some embodiments may use a traditional rack design with a hot aisle.

In some embodiments, the edge-based data centers 14, 18, and 22 may collectively form a distributed cloud computing environment in which computing resources are positioned physically proximate to computing devices that consume those resources, and in some cases, the consumer devices move through a geographic area in which a plurality of such edge-based data centers cooperate to serve a computing load of the consumer devices. In some embodiments, the edge-based data centers 14, 18, and 22 may form a peer-to-peer network of edge-based data centers that is relatively easily scaled by adding additional peers to the network and is managed with the various data center management techniques and rack controllers in the references described and incorporated by reference above.

In some embodiments, the edge-based data centers 14, 18, and 22 may be operated by a single entity and may expose a single application program interface for provisioning computing resources, which may include instantiating virtual machines, orchestrating containers, instantiating unikernel instances, and spinning down these resources when no longer needed. Further, this application program interface may expose services by which network addresses are assigned or managed, data is stored, data is accessed, machine images or unikernel images are configured, monitored, discovered, and the like.

In some embodiments, different subsets of the base stations may be operated by different entities, for instance, different cellular network providers or different mobile switching telephone centers. In some embodiments, base stations 12 and 16 may be operated by a first cellular carrier, and base station 20 may be operated by a different cellular carrier. As a result, base stations 12 and 16 may communicate with one another and be controlled by a mobile switching center server 26, while base station 20 may be controlled by and communicate with a different mobile switching center server 28. In some embodiments, these mobile switching center servers 26 and 28 may both connect to the Internet 30, such as various backbone networks of the Internet.

In some embodiments, the computing environment 10 further includes a collection of peer compute nodes 32 that may cooperate to execute various distributed applications, some of which may coordinate handoffs among the various base stations. In some embodiments, the compute nodes 32 may execute on the various edge-based data centers 14, 18, and 22, for instance, consuming a subset of the computing resources on each of these data centers, or in some cases the peer compute nodes 32 may execute elsewhere. In some embodiments, the peer compute nodes 32 execute client applications of a distributed, ad hoc, peer-to-peer computing application, such as various block-chain-based applications, like Bitcoin, Ethereum, FileCoin, IPFS, and the like.

In some embodiments, the peer compute nodes 32 may host one or more distributed hash tables (DHT) by which resources are accessed by distributed applications and by which different peer compute nodes are determined to have various resources. The DHT architecture may relatively efficiently route commands, data, output or output results of operations to peer compute nodes of a given key, like users or other applications. In some embodiments, various DHT architectures may be implemented, for instance, Chord, Kademlia, or Ethereum's implementation of Kademlia. Thus, an address space may be created and managed by peer compute nodes 32 without a central authority routing messages or managing the address space, making the system relatively robust to failure of any one the peer compute nodes 32.

In some embodiments of the DHT, the peer compute nodes may be organized on a unidimensional identifier ring, such as a set of sequential addresses that upon reaching a maximum value reset to a minim value when incrementing through the address space, or a linked list that forms a ring. The ring may include a relatively large amount of peer compute nodes, for instance, more than 20, more than 100, more than 1,000, or more than 10,000 peer compute nodes (which may be peer computing devices, or one of several virtual machines, containers, unikernels, or processes executing on the peer computing devices). Each of the peer compute nodes 32 may be assigned a node ID, such as a unique 160 bit key determined by a cryptographic hash function, for instance, SHA or MD5, and organized on an identifier ring, based on their assigned node ID. Various resources, e.g., files, stored on the peer compute node may be input into a cryptographic hash function to generate resource identifiers, and then stored by a peer node in the ring at a peer compute node closest to the hash identifier of the resource. Each peer compute node may maintain partial routing information (e.g., a subset of a list of key-value pairs that associate IP addresses (and port numbers in some cases) of peer compute nodes with corresponding node IDs for the entire DHT). Nodes may be reached via successive, sequential forwarding by other peer compute nodes to efficiently route resources across two, three, four, or five or more hops, getting closer with each hop to a node with the appropriate subset of the list in memory to identify the IP address of a node with the accessed resource. For instance, peer compute nodes P0, P5, P10, P15, P20 . . . PX, may be arranged in the consecutive order around a ring data structure. In the ring, the peer compute nodes may maintain direct connections to their successor and predecessor peer compute nodes along the ring (e.g., they may have in memory the IP address, port number, and an index of resource identifiers stored therein for adjacent nodes, such that adjacent nodes can be reached without requesting routing services by some other node in the ring). The key value pairs, for instance, of node ID of P10, is stored in the of the successor peer compute node P15, as well as replicas of the data at node P10. If the peer compute node P10 fails, peer compute node P15 becomes responsible also for the ID space of peer compute node P10, including the key, thereby, potentially maintaining access for the DHT to the data of peer compute node P10.

In some embodiments, the exchange of data may be facilitated through peer compute node lookup. The peer compute nodes may communicate among themselves using User Datagram Protocol (UDP), forming an overlay network (e.g., at the transport layer or application layer). Each of the peer compute nodes 32 may have a unique 160 bit key, which may be a node ID, and may be determined by a cryptographic hash function. The node ID may identify the given peer compute node 32 on the network and may provide a direct map on how to locate a particular hash value associated with an object, for instance, a file. In some embodiments, upon failure of a peer compute node 32 (e.g., failure to send a heartbeat signal or failure to a request within some threshold duration), neighboring peer compute nodes may discover the failed peer compute node and calculate the range of impact of the failure, according to the distance between the node ID of the neighboring peer compute node and the node ID of the failed peer compute node. The distance (in the DHT address space) between the neighboring peer compute nodes and the failed peer compute node may be calculated using 'exclusive or', (XOR). For instance, the distance between two binary peer compute nodes, 0011 and 1001, may be calculated by taking the 'exclusive or' of the two numbers (e.g. 0011⊕0011) to obtain 1010, which may be the substitute peer compute node. As shown, the XOR operator may reveal the bit positions that are different between the two numbers.

In some embodiments, distributed applications may be deployed to peer-to-peer computing environments hosted by the peer compute nodes 32, for instance within a Ethereum, FileCoin, IPFS, or combinations thereof. In some embodiments, each distributed application may be assigned an address, and an application program interface of the respective distributed application may be called within the peer-to-peer computing environment by associating that address with a corresponding application program interface request. In some embodiments, the address may be a public key or may include a public key associated with a private key of the respective peer-to-peer application or a user. In some cases, various messages related to the application may be cryptographically signed with the private key. Other computing nodes may validate that such messages were signed by an entity with access to the private key based upon the corresponding public key. In some cases, messages to the application or other entities may be encrypted with the corresponding public key that also, in some instances, serves as an identifier, and the corresponding entity may decrypt the message with the corresponding private key. In some embodiments, the public and private keys are provided with various public key infrastructure algorithms, such as RSA, DSA, or ECDSA.

Figure 2:
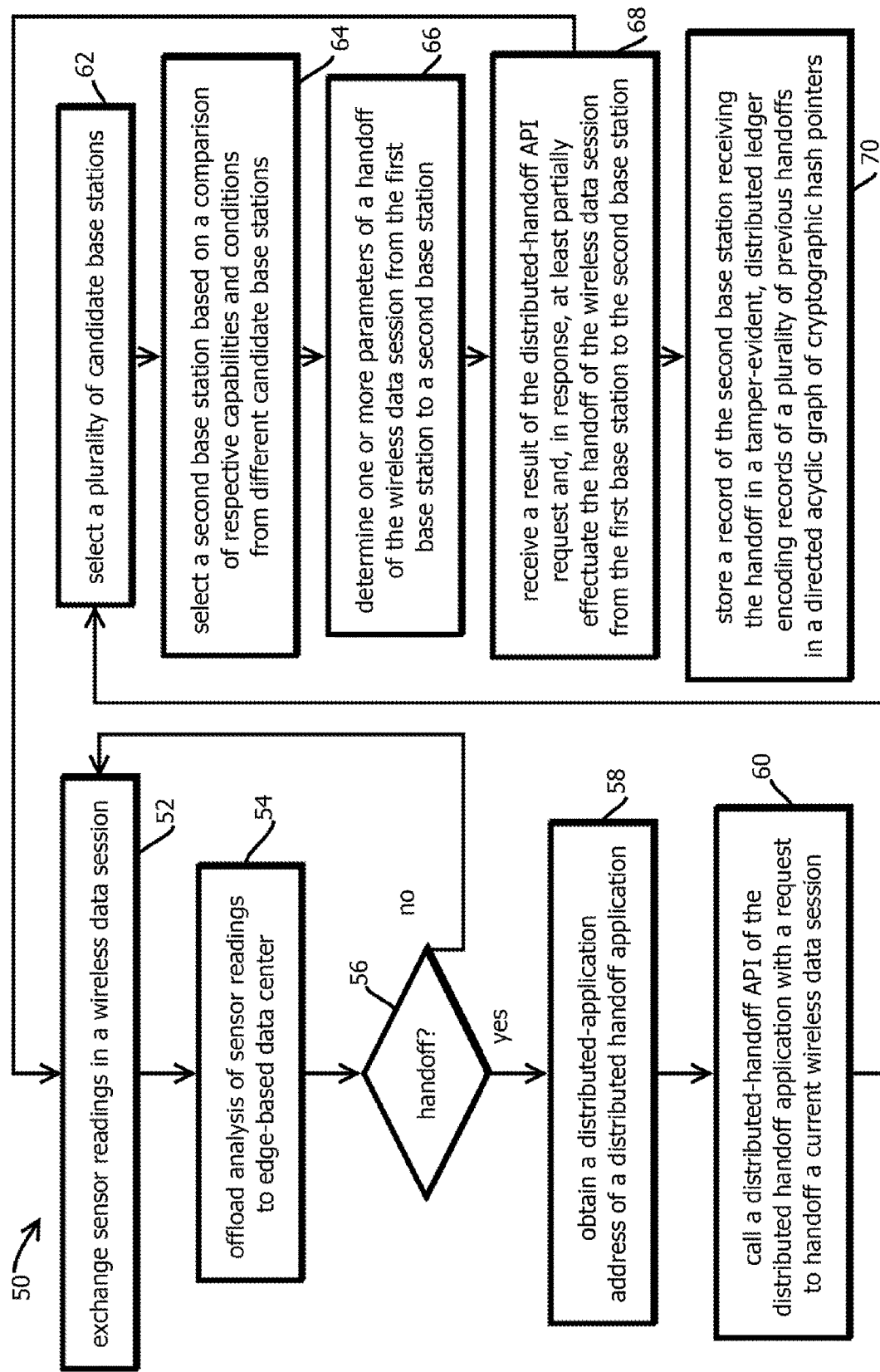
FIG. 2 is a flowchart of a process that may be implemented in the computing environment of FIG. 1 to effectuate handoffs between wireless base stations in accordance with some embodiments.

In some embodiments, one or more of the distributed applications may execute one or more routines in a distributed fashion on peer compute nodes 32 by which wireless handoffs are effectuated. In some embodiments, this may include cooperating with other portions of the computing environment 10 to execute the process 50 of FIG. 2. In some embodiments, the various operations of the process 50 may be executed in a different order, operations may be omitted, operations may be replicated, additional operations may be included, some operations may be performed concurrently, some operations may be performed sequentially, and multiple instances of the process 50 may be executed concurrently, none of which is to suggest that any other description herein is limited to the arrangement described. In some embodiments, the operations of the process 50 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

In some embodiments, the process 50 includes exchanging sensor readings in a wireless data session, as indicated by block 52. In some cases, this may include the above-describe mobile computing device 24 gathering data about its environment with various sensors of the mobile computing device 24. This may include capturing images, such as in a video feed with a plurality of cameras, capturing depth-sensor readings, for instance with a light detection and ranging (LIDAR) sensor, sensing audio data with a microphone, and the like.

Some embodiments may offload analysis of the sensor readings to an edge-based data center, as indicated by block 54. In some embodiments, as a mobile computing device 24 moves along the illustrated route, the offloaded analysis may be offloaded to different ones of the data centers shown in FIG. 1. For example, the offloaded analysis may be performed by a data center associated with a base station to which the mobile computing device 24 is participating in a wireless data session. As a wireless data session is handed off, the edge-based data centers may similarly handoff ongoing analysis, and in some cases executing the analysis concurrently until a state of a subsequent data center is equal to or has superior data relative to a previous edge-based data center. The superiority of data may be determined by calculating a half-life score of an aggregate amount of received data and determining when a difference in the score for a new data center from that of a previous data center is less than a threshold.

In some embodiments, this may also include sending wireless data to the mobile computing device, for instance, from a network, or as a result of operations by the edge-based data centers. For example, a self-driving car or an autonomous drone may gather relatively high dimensional high-bandwidth data, such as multiple video feeds, a LIDAR feed, or both, and convey that via a wireless connection to a given one of the base stations, which may then convey it to an associated data center. The associated edge-based data center may then execute various machine-learning algorithms, for instance, convolution neural networks, or the like, configured to classify the images or detect features within the images or objects within the images. Examples include identifying pedestrians or other cars or detecting features corresponding to lines in a road. In some cases, the results of these operations may then be conveyed back to the mobile computing device 24 via the wireless data session, for instance, values indicating where within a frame of video (or LIDAR scan) various objects are detected, and polygons bounding those objects. Some embodiments may infer a three-dimensional environment and send a model of the three-dimensional environment with classifications applied to various items within the three-dimensional environment back to the mobile computing device. In some embodiments, the edge-based data center may determine how to adjust actuators on the mobile computing device 24 responsive to the sensor data, for instance, determining a direction (and amount and rate) in which to turn a steering wheel to reorient a tire, determining an amount of torque or horsepower (and rate of change) to apply to a given one of the wheels or each of the wheels, determining whether to apply brakes, determining a set point for any of six axes of a flying drone, or the like.

Some embodiments may periodically determine whether to handoff a mobile computing device wireless data session between base stations, as indicated by block 56. In some embodiments, the handoff determination may be made by a current base station or baseband controller to which the mobile computing device is currently connected. The determination may be made responsive to a signal-to-noise ratio dropping below threshold, an amount of dropped packets exceeding a threshold, an amount of available bandwidth falling below the threshold, or the like. Or in some cases the handoff determination may be made by the mobile computing device 24 based on similar criteria. Upon determining that no handoff is needed, some embodiments may return to block 52 and continue exchanging sensor readings and analyzing the sensor readings with the edge-based data center, as indicated by block 54, for instance, via the various application program interfaces described above for distributed cloud computing environments having edge-based data centers.

Alternatively, upon determining to perform handoff, some embodiments may coordinate the handoff with one of the above-described distributed applications executing on the peer computing devices of FIG. 1. In some embodiments, this may include calling a Turing-complete block-chain-based smart contract (e.g., an Ethereum smart contract) by which different base stations, different mobile switching centers, different baseband controllers, or different cellular carriers coordinate handoffs. In some embodiments, different distributed applications may select the subsequent base station for the handoff and coordinate the handoff, or in some cases a single distributed application, such as a single block chain smart contract may coordinate the handoff. In some embodiments, a subset of the universe of base stations participating in one of the smart contracts may be selected, for instance, by querying a geographic information system with a current geolocation of the mobile computing device, and in some cases a velocity of the mobile computing device and a route of the mobile computing device across a geographic area, such as a route programmed into an autonomous drone or a self-driving car. In some embodiments, a geographic information system, such as a wireless database having coverage areas and geolocations of various base stations and parameters thereof (e.g., coverage area, available bandwidth, speed, SINR, SNR, and supported protocols) may respond with a selection of candidate base stations or a given base station with which to coordinate a subsequent handoff. In some embodiments, these operations may be performed by a smart contract executing on the ad hoc peer-to-peer distributed computing applications on peer compute nodes 32.

In some embodiments, the process may include obtaining a distributed application address of this distributed handoff application, as indicated by block 58. In some cases, this address may be an address of one of the distributed applications described above, such as an address that serves as an entry point into a distributed hash table. In some embodiments, the process 50 includes calling the distributed handoff application program interface of the distributed handoff application with a request to handoff a current wireless data session, as indicated by block 60. In some embodiments, the call may be initiated by a mobile computing device or by one of the base stations, such as a base station seeking to handoff a current wireless data session. In some embodiments, the application program interface called may include an identifier, such as a public cryptographic key that serves as an identifier of a base station to which a handoff is sought. In some cases the call may include various parameters by which such a base station may be selected, for example, a geolocation of the mobile computing device, a velocity the mobile computing device, a route through geographic area of the mobile computing device, wireless radio capabilities of the mobile computing device, wireless protocol supported by the mobile computing device, an amount of bandwidth expected to be consumed by the mobile computing device, a service level required by the mobile computing device, or the like.

In some embodiments, the call to the distributed handoff application program interface may be routed via one of the above-described distributed hash tables to one or more of the computing devices in the peer-to-peer distributed computing environment described above, which may include a Turing-complete block chain implementation, like Ethereum, configured to execute a smart contract by which a handoff is effectuated, for instance, based on parameters in the distributed handoff application program interface request. In some embodiments, every peer node on a DHT (or a sharded subset of peer nodes) may execute the code of the smart contract invoked by the distributed handoff application program interface call. The peer nodes that evaluate the smart contract may determine a response to the API call based on the above-described distributed consensus algorithms, e.g., by arriving at a consensus as to the correct response, for instance with a majority vote among those peer nodes that compute the API response or those peer nodes that both compute the API response and demonstrate a proof of work, proof of storage, or proof of stake solution. Thus, some embodiments may be robust to untrusted peer compute nodes in which a malicious actor may attempt to interfere with the distributed handoff application, as other peer nodes may arrive at a consensus based on an un-adulterated response to an API request.

Some embodiments may include selecting, with the smart contract executing on the computing devices, a plurality of candidate base stations, for instance, responsive to the handoff application program interface request (or as noted above this operation may be performed in a different distributed handoff application or a non-distributed application), as indicated by block 62.

Some embodiments may then select a second base station based on a comparison of respective capabilities and conditions from different candidate base stations, as indicated by block 64. Again, this may be performed within a distributed peer-to-peer ad hoc computing environment like those described above, or in a centralized database.

Some embodiments may determine one or more parameters of the handoff of the wireless data session from the first base station to a second base station, as indicated by block 66. In some cases, these parameters may include a time of the handoff, a cryptographic key, such as a public cryptographic key of the mobile computing device by which the second base station is to communicate in the wireless data session with the mobile computing device, broadcast strength, broadcast channels, wireless data protocols, session identifiers, programmed state of offloaded analysis of sensor readings, and network addresses of the mobile computing device. In some embodiments, these receive parameters may be conveyed to the second base station or a baseband controller of the second base station. The handoff may be effectuated by transitioning the wireless data session from the first base station to the second base station, in some cases, within less than 100 ms of initiating the handoff, and in some cases with less than 50 ms of loss of wireless data coverage. In some cases, these determined parameters may further include terms for payment between the operators of the different base stations, in some cases with different base stations bidding on the opportunity to participate in the wireless data session in the distributed smart contract, for instance, bidding with payment terms, service levels, bandwidth, or combinations thereof. In some embodiments, the smart contract may be configured to score each of the bids, for instance, with a weighted combination of bid parameters and to calculate a highest-scoring bid upon a threshold time or threshold number of bids being exceeded and select the highest-scoring bid. In some embodiments, two, three, five or more base stations with overlapping coverage may bid for the opportunity to continue the wireless data session.

Some embodiments may receive a result of the distributed handoff API request and, in response, at least partially effectuate the handoff of the wireless data session from the first base station to the second base station, as indicated by block 68. In some embodiments, the second base station may continue communicating in the wireless data session with the mobile computing device using the received determined parameters. In some embodiments, this may include transitioning a state of a program analyzing the sensor readings between different edge-based data centers, like those described above. In some embodiments, this may include instantiating different computational entities, like virtual machines, containers, unikernels, or the like on the subsequent edge-based data centers and initiating a program state of programs executing in those computing entities, for instance, with data fed concurrently to the older and newer edge-based data centers for a threshold duration of time and with various parameters of an ongoing computing task, like a route of the mobile computing device, a velocity of the mobile computing device, or the like. Output of the older (in a wireless session) edge-based data center may be fed to both the mobile computing device and the newer edge-based data center concurrently and used to update state of the newer edge-based data center.

In some embodiments, the mobile computing device may be provided with a consistent network address that follows the mobile computing device across different base stations, such as an Internet Protocol address or an address in one of the above-described peer-to-peer distributed computing environments, like an address in a distributed hash table by which resources are accessed in these computing environments. In some embodiments, the mobile computing device may have an address like that assigned to the distributed handoff application and may constitute an entity in one of these computing environments. In some embodiments, the mobile computing device may maintain the same IP address across different base stations with a record mapping the Internet Protocol address of the mobile computing device to the current base station with a record that is updated during handoff to reflect the newly assigned base station. In some embodiments, this record may be stored as program state in one or more of the above-described distributed computing applications. Other computing devices seeking to communicate with the mobile computing device, for instance in the wireless data session, may cause the distributed computing application to look up the current base station to which the mobile computing device is communicating in these records, for instance retrieving a value from a block chain ledger indicating a result of the handoff after the handoff has occurred.

Some embodiments include storing a record of the second base station receiving the handoff in a tamper-evident, distributed ledger encoding records of a plurality of previous handoffs in a directed acyclic graph of cryptographic hash pointers, as indicated by block 70. In some embodiments, the cryptographic hash pointers may include a plurality of blocks arranged in a chain, with each block including a cryptographic hash pointer to a previous block, and the blocks arranged sequentially in an order of creation. In some embodiments, each block may include a Merkel tree, such as a binary tree of cryptographic hash pointers with leaf nodes storing the record or previous records of previous handoffs. In some embodiments, each cryptographic hash pointer may include a cryptographic hash value determined by a cryptographic hash function, for instance, SHA-1, SHA-2, SHA-3 or MD5. In some embodiments, the cryptographic hash values may be based on a content of a node, or a plurality of nodes, to which the cryptographic hash pointer point, and content of each node may include its respective cryptographic hash pointer hash values.

In some embodiments, an Internet Protocol address of the mobile computing device may be stored in a block chain or in one of the above-described distributed hash tables. In some embodiments, these records may be interrogated in order to communicate with the mobile computing device with a consistent address of the mobile computing device as the mobile computing device moves between base stations.

Thus, as noted above, in some embodiments, an Internet Protocol address may serve as a persistent identifier of a wireless mobile computing device moving through a geographic area and having wireless connections that are handed off between different wireless base stations, thereby dynamically changing the physical network node through which a computing device is accessible at a given networking layer address.

Alternatively, or additionally, some embodiments may implement the present techniques with name resolution, where a persistent, unique name for a computing device is held constant while other addresses (e.g., at different layers of the OSI stack) potentially change over time and location. For instance, rather than, or in addition to, a persistent IP address, hosts on the network may be assigned a name in a namespace in which each device has a unique name and different IP addresses may be mapped to the same name at different times. In some cases, name resolution may be performed at the data link layer, for instance, at the medium access control (MAC) sublayer of the data link layer. Thus, the registration of new devices in a wireless "zone/region" may be translated (between device name and network address) at the MAC level in the OSI stack. In some cases, resolution of names to network addresses may cascade up to layer 3 of the OSI model, where routing takes place (e.g., at the layer implementing Internet Protocol exchanges), and in some embodiments, ultimately up to layer 7 for application-layer exchanges, including intermediate layers, like transport layer exchanges at layer 4, where UDP and TCP reside or other transport layer protocol communications reside. It should be emphasized, though, that the present techniques are not limited to the current OSI model, as it is contemplated that a new networking stack could be built on top of the present techniques, which is not to suggest that any other description herein is limiting.

In some embodiments, a persistent name may be assigned to each computing device expected to serve as an endpoint on the network described above with reference to FIG. 1 (e.g., a host). In some embodiments, each computing device may be assigned a different name. In some embodiments, the name is a human readable name, like a domain name, such as a hierarchical human readable name having reserved characters that serve as delimiters between different levels of the hierarchy (e.g., autonomous-vehicles.ford.f150.2019.smith1). Another example may be a non-human readable, such as arbitrary, string, for example, a medium access control burned-in address assigned by a manufacturer to a wireless device according to the MAC-48, EUI-48, and EUI-64 standards. In some embodiments, the persistent name may be a public key of an asymmetric encryption key pair (e.g., one of the examples described above) assigned to a wireless device by a network authority or generated based on a known unique identifier, like a MAC address concatenated with a password. Or in some embodiments, a persistent name may be a combination of these different types of names in a single name.

In some embodiments, a computing device may select a new base station (or have a new base station selected) for handoff to that new base station, for example, in accordance with the techniques described above, like when a computing device moves into a geographic zone within wireless broadcast range of a new base station and upon leaving the broadcast range of an old base station. Upon selecting a new base station, some embodiments may register a given computing device with that new base station. In some embodiments, registering may include causing the new base station to update a routing table, a medium access control table, or the like, with the persistent name of the computing device in memory of the respective base station. In some embodiments, the base station handing off a given wireless device may inform the new base station of the persistent identifier, the wireless device itself may inform the new base station of the persistent identifier, or both.

In some embodiments, a wireless device may authenticate itself to a new base station as being entitled to use the persistent name with a cryptographic signature. The cryptographic signature may be signed with a private encryption key associated with a public encryption key available to the new base station as being authoritatively associated with the persistent name. In some embodiments, upon the new base station determining that the cryptographic signature is flawed, for example, was not signed by an entity with access to the corresponding private key, the update attempt may be rejected. Alternatively, upon the signature being validated, some embodiments may register the persistent name in memory of the base station.

In some embodiments, registration may include creating a record in a table of the new base station that associates the persistent name of the wireless computing device with a wireless channel access configuration by which the new base station communicates with the wireless device. Examples of configuration parameters include a time slot in a time division multiple access protocol, a code in a code division multiple access protocol, a frequency in a frequency division multiple access protocol, or a combination thereof in more advanced protocols that combine these techniques. When communications are received that are addressed to the wireless computing device having the persistent name, the new base station may access this table to identify parameters with which to configure a broadcast of the new information to the wireless computing device in accordance with the wireless channel access configuration.

In some embodiments, different Internet Protocol addresses, port numbers, or channel access configurations may be associated with a given wireless computing device at different times at different base stations as the wireless computing device moves through an area is and is handed off to different base stations.

In some embodiments, upon registering the persistent name with the new base station, in some embodiments, a record may be created by which other base stations or other network nodes may select routes to the wireless computing device through the network by specifying the persistent name. Examples include various centralized or distributed lookup data structures, like the above-describe distributed hash tables, which may map a persistent name to an Internet protocol address, port number, and channel access configuration of the new base station and wireless device. Other examples include implementations built on a hierarchical domain name service, records in distributed nodes implementing the Interplanetary File System Protocol, or records added to the namecoin block chain distributed ledger, mapping layer 2, 3, and 4 addresses (or subsets thereof) to the persistent name.

In some embodiments, there may be delays while distributed lookup records are updated upon a handoff, and these delays may cause a message addressed to the wireless computing device shortly after handoff to be routed to the former base station rather than a new base station to which a handoff has been executed. To mitigate the risk of lost messages, in some embodiments, the handing off base station may update its record associated with the persistent name to include a pointer to the new base station to which handoff was executed, for example upon receiving an acknowledgment from the new base station the handoff is complete, the acknowledgment including parameters by which the wireless computing device may be reached via the new base station. Upon receiving a packet for the wireless device at the old base station with stale routing, the old base station may forward the packet to the new base station based on these pointers. In some cases, this forwarding operation may occur over multiple hops. In some embodiments, these records may be expired after a threshold amount of time, or upon querying a distributed lookup system and determining that the distributed lookup system has been updated to reflect the handoff.

In some embodiments, the operations implementing persistent name resolution may span various layers of a networking stack. For example, application layer exchanges may reference the wireless computing device with the persistent name, transport layer exchanges may reference the wireless computing device with the persistent name, networking layer exchanges may reference the wireless computing device with the persistent name, or data link layer exchanges may reference the wireless computing device with the persistent name. In some cases, these references may be made in headers, for example, in source or address fields of headers of packets or frames sent by or to the wireless computing device bearing a given persistent name. In some cases, a receiving network node, like a base station, router, or switch, may parse a persistent name from a header or application-layer payload, access the above-described lookup data structures to resolve the name to network address, and in some cases, a port number and channel access configuration, and route the message based on the result of the name resolution operations.

As touched on above, many existing networks are not well suited for mobile, high-bandwidth, latency sensitive use cases. Buffering, as is often used in video streaming, is of limited use in scenarios where latency budgets are tight, e.g., when offloading visual simultaneous localization and mapping to edge-based data centers from an autonomous vehicle. Further, many cross-layer functions, like domain-name services and orchestration tooling that tie the application layer to the network layer, are not well suited to these types of use cases, as latency budgets are often substantially smaller than the time typically taken to update the global address table or even private domain name services. (None of which is to suggest that systems exhibiting these issues are disclaimed, that various techniques described herein may not be used in conjunction with such systems, or that any other subject matter is disclaimed in virtue of discussing tradeoffs in engineering choices.)

Some embodiments implement a dynamic store of information about a computing resource in a private (or public) distributed (e.g., decentralized) tamper-evident ledger (e.g., a blockchain or other directed acyclic graph of cryptographic hash pointers). In some embodiments, once a physical location of a mobile computing device moves between wireless coverage areas (e.g., cell tower coverage areas, WiFi™ access areas, low-Earth orbit satellite coverage areas, etc.) the record in the block gets updated with new data, e.g., by appending a new version of the record to the ledger with a pointer to the previous version of the record in an earlier block. Some implementations may more comprehensively secure routing tables on traditional networks, and in some embodiments, these records may serve as the basis for route management across the network.

In some embodiments, network participants may advertise their characteristics (e.g., capabilities, requirements, service-level guarantees, etc.) in a record documented in a decentralized tamper-evident data store, like a blockchain. These records may include values corresponding to each of a set of components in a distributed computing environment that includes base stations, mobile switching center servers, edge-based data centers, and other computing components. These values may include identifiers or performance metric values for one or more of the elements in the distributed computing environment, may be advertised to a distributed (e.g., decentralized) application, and may be stored in a tamper-evident, distributed ledger encoding records of a plurality of previous advertised values in a directed acyclic graph of cryptographic hash pointers. Some embodiments may determine one or more network paths between a mobile computing device and an edge-based data center (or other resource) based on these advertised values to increase application efficiency or fulfill request requirements. In some embodiments, a request can be used to call a distributed API to determine a network path, whereby data from a mobile computing device can be transferred to an edge-based data center for computation through the network path, or vice versa. Some requests to determine a network path can explicitly include instructions to determine the network path. Alternatively, some requests to determine a network path can implicitly cause network path generation by causing a distributed application to select a target data center to perform computations based on data received from a mobile computing device.

In some embodiments, a network path can be formed by interconnected links in a networking layer of a peer-to-peer network. Alternatively, or additionally, the network path can include links in a transport layer, application layer, or other layers of the OSI stack. The network path can be generated using values stored in the tamper-evident, distributed ledger to increase confidence in the security and reliability of the network path. The ends of a network path can transfer data via links between various components such as base stations, edge-based data centers, mobile computing devices, other electronic devices, etc. In some embodiments, a data packet can be transferred along a network path from a base station to an edge-based data center. Alternatively, or in addition, a data packet can be transferred along a network path from a first edge-based data center to a second edge-based data center. For example, some embodiments can transfer application state values along a network path between edge-based data centers to allow a dynamic federated cluster to travel with the mobile computing device. Furthermore, data packets (or frames) (e.g., payloads thereof) (like TCP packets, IP packets, or Ethernet frames) traveling along a network path of the peer-to-peer network may themselves be encrypted or decrypted. In some embodiments, encryption and decryption may be performed by any one of the edge-based data centers, or other devices along the network path (e.g., to encrypt packet payloads while in flight). In some embodiments, encrypted data packets may contain metadata that allow inspections at various layers along a network path without requiring decryption of the data packets. For instance, payloads may be encrypted and headers with such metadata may remain unencrypted. In some cases, encryption may be layered, with one ciphertext containing both another ciphertext and such metadata, and with different ciphertexts having different keys or key pairs. In some cases, the encryption may be asymmetric encryption, symmetric encryption, or a hybrid encryption scheme. In some cases, a symmetric key may be exchanged via public-key encryption to initiate a session, and that symmetric key may be applied throughout the session to reduce processing overhead relative to exclusively asymmetric encryption systems (which is not to suggest that exclusively asymmetric encryption or any other subject matter is disclaimed).

Figure 3:
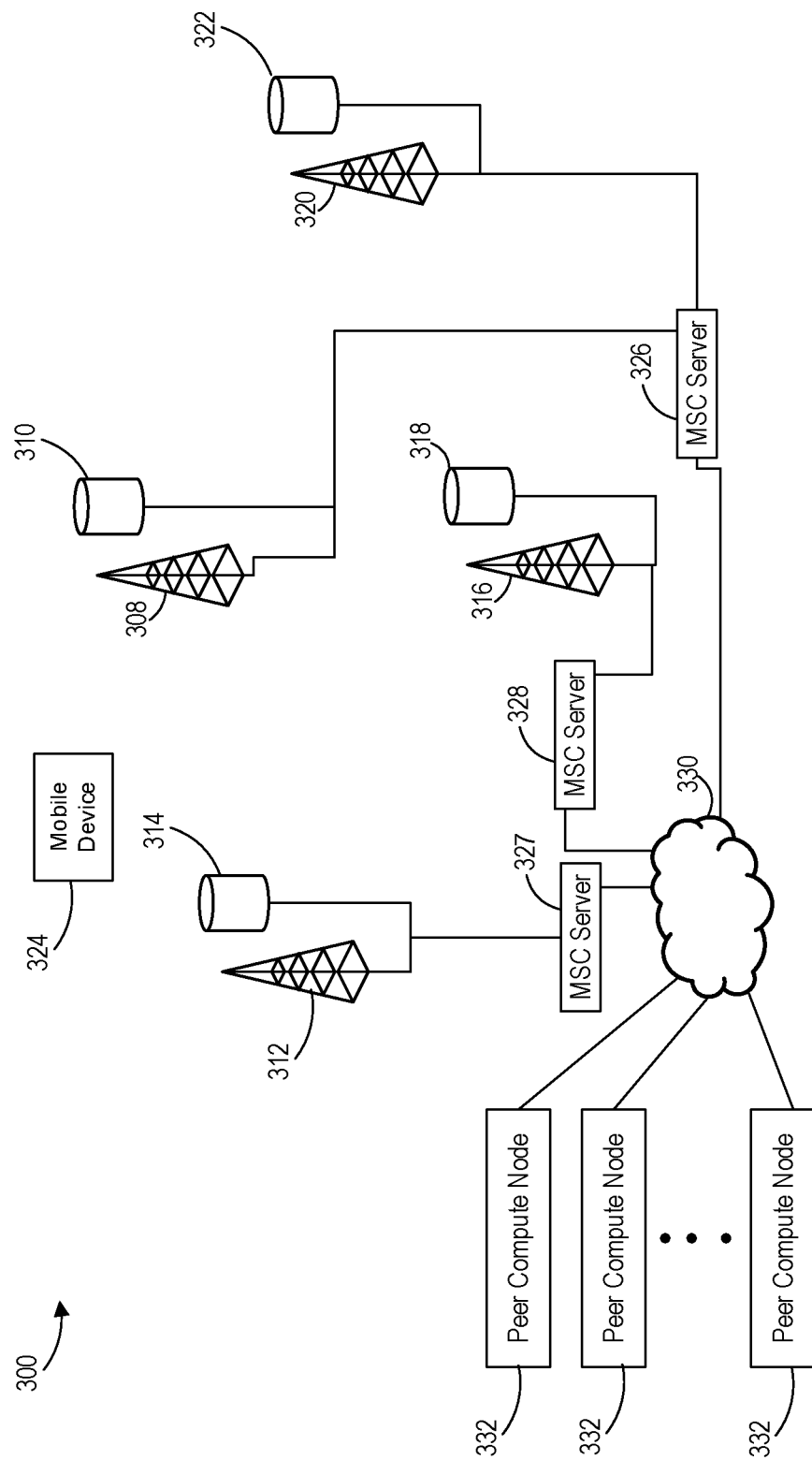
FIG. 3 is a schematic diagram of a second computing environment in which various networks may be implemented in accordance with some of the present techniques.

FIG. 3 is a schematic diagram of a second computing environment in which various networks in accordance with the present techniques may be implemented in accordance with some embodiments. The data center identifiers can include identifiers of specific edge-based data centers, permitted applications or application types, permitted requests or request types, non-permitted application or application types, linked data centers, links to neighboring edge-based data centers or other data centers, etc. The performance metric of an edge-based data center can include performance metrics for the edge-based data center itself and performance metrics corresponding to links to/from the edge-based data center. The performance metric can be a metric such as latency, bandwidth, available computing resources for general applications, available computing resources for specific applications or request types, available processor use time, available number of cores, available memory, etc. The edge-based data centers may be used to store one or more databases, files, and operated distributed applications such as a distributed machine learning system (e.g. distributed neural network or ensemble machine learning system in which different models execute on different hosts).

Some or all of the above-described techniques can be implemented in a computing environment 300 shown in FIG. 3. The computing environment 300 can span a geographic area that includes base stations 308, 312, 316, and 320 and edge-based data centers 310, 314, 318, and 322. Four pairs of base stations and edge-based data centers are shown, but commercial implementations can include substantially more. In the illustrated example, each base station 308, 312, 316, and 320 is paired with a different edge-based data center 310, 314, 318, and 322, but other embodiments may have a different ratio. In some embodiments, different subsets of the base stations may be operated by different entities. For example, the base stations 308 and 320 may be operated by a first cellular carrier, base station 312 may be operated by a second cellular carrier, and base station 316 may be operated by a third cellular carrier. As a result, base stations 308 and 320 may communicate with one another and be controlled by a first mobile switching center server 326, base station 312 may be controlled by and communicate with a second mobile switching center server 327, and may be controlled by and communicate with a different mobile switching center server 328. In some embodiments, these mobile switching center servers 326-328 may both connect to the Internet 330, similar to the mobile switching center servers 26 and 28 described above for FIG. 1.

In some embodiments, the computing environment 300 further includes a collection of peer compute nodes 332 that may cooperate to execute various distributed (e.g., decentralized) applications, some of which may determine network paths in a distributed computing environment that includes the edge-based data centers 310, 314, 318, and 322. In some embodiments, the compute nodes 332 may execute on the edge-based data centers 310, 314, 318, and 322, or in some cases the peer compute nodes 332 may execute elsewhere. In some embodiments, the peer compute nodes 332 may host one or more DHT, similar to the peer compute nodes 32 described above for FIG. 1.

Some embodiments can advertise computing component identifiers or performance metric values for some or all of the elements of the computing environment 300. Some embodiments can advertise values for each of the set of edge-based data centers 310, 314, 318, and 322 to a distributed application being executed by the compute nodes 332. For example, some embodiments can advertise (e.g., make available a record accessible to some or all other nodes in a peer-to-peer network executing on the computing environment 300) that the edge-based data center 314 is permitted to compute results for consumption by augmented reality applications, its available memory for use is ten gigabytes, and that it can communicate with the edge-based data center 310 with a latency of 5 ms. Some embodiments can use routing methods to determine a network path based on these advertised values. Some embodiments can determine a network path for the distributed computing environment in a peer-to-peer layer. Alternatively, some embodiments can use the routing method to determine a network path in any layers through which data can be transferred to or from the edge-based data centers. For example, some embodiments can determine a network path at the transport layer of an OSI stack for a distributed computing environment comprising the edge-based data centers 310, 314, 318, and 322.

Figure 4:
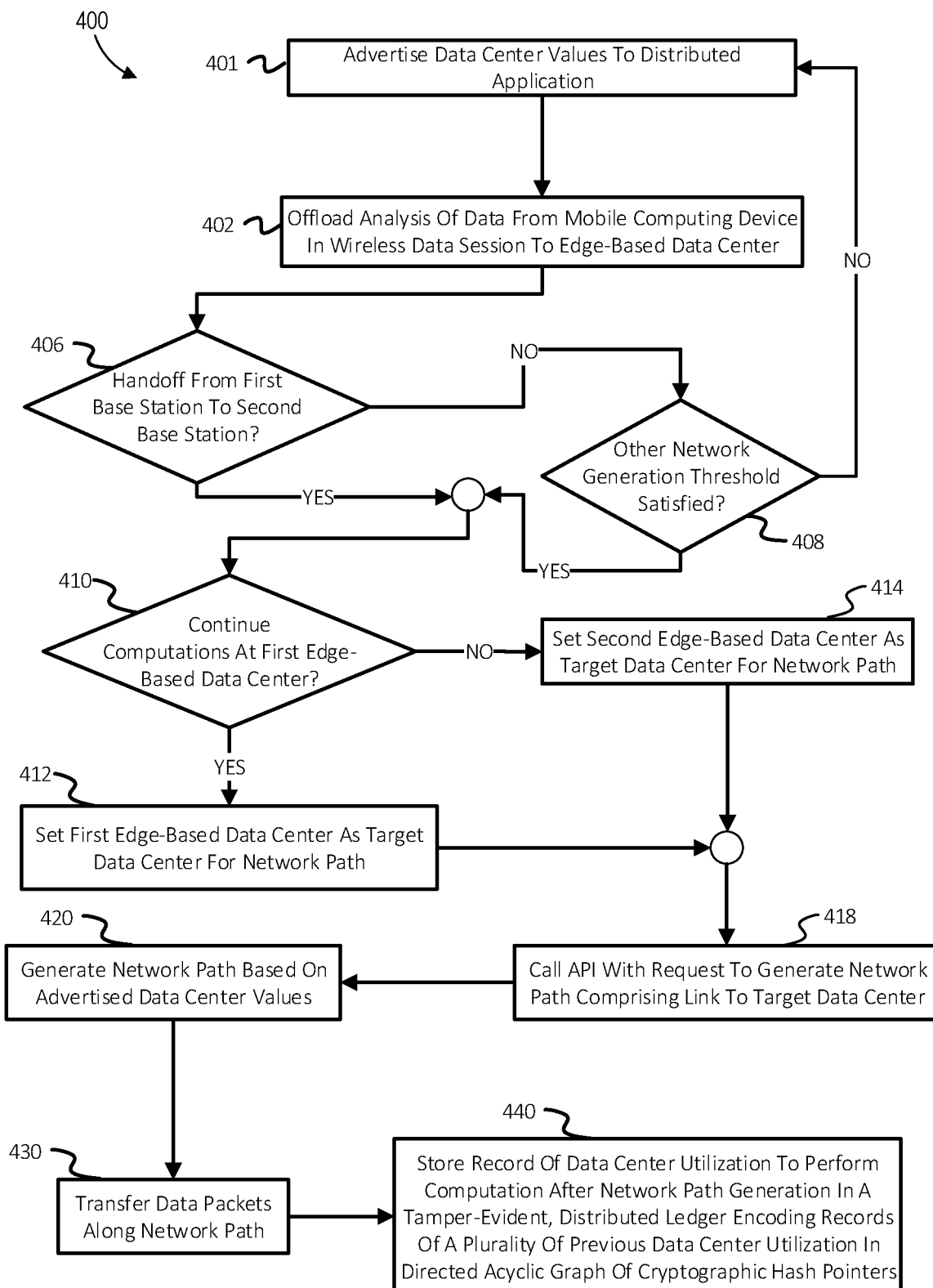
FIG. 4 is a flowchart of a process that may be implemented in the computing environment of FIG. 3 to determine new network paths in accordance with some of the present techniques.

In some embodiments, one or more of the distributed (e.g., decentralized) applications may execute one or more routines in a distributed fashion on peer compute nodes 332 that cause network path generation. In some embodiments, this may include cooperating with other portions of the computing environment 300 to execute the process 400 of FIG. 4. For example, the process 400 can be performed by an application being executed on the edge-based data centers 310, 314, 318, and 322 described with reference to FIG. 3. In some embodiments, the various operations of the process 400 may be executed in a different order, operations may be omitted, operations may be replicated, additional operations may be included, some operations may be performed concurrently, some operations may be performed sequentially, and multiple instances of the process 400 may be executed concurrently, none of which is to suggest that any other description herein is limited to the arrangement described. In some embodiments, the operations of the process 400 may be effectuated by executing program code stored in one or more instances of a machine-readable non-transitory medium.

In some embodiments, the process 400 includes advertising performance metric values of computing components of a distributed computing environment to a distributed application, as indicated by block 401. In some cases, this may include a plurality of the updating a tamper-evident, distributed ledger with messages representing identifiers or performance metric values. In some embodiments, the advertised messages (or a cryptographic hash digest thereof) can be stored in a tamper-evident, distributed ledger encoding records of a plurality of previously advertised values in a directed acyclic graph of cryptographic hash pointers. In some embodiments, the types of values performance metrics advertised for a computing component of a distributed computing environment can be based on the computing component itself. For example, a base station can advertise performance metrics such as an encoding, available bandwidth, broadcast range or strength, available wireless spectrum, a quality of service, a signal-to-noise-ratio, a signal-to-interference-plus-noise ratio (SINR), etc. Additionally, an edge-based data center can advertise a system temperature, cooling equipment status, an available number of flops, an available amount of random access memory (RAM), etc. Additionally, a server can advertise values such as a latency, a bandwidth, a number of linked elements, a number of linked servers or other computing components, etc. In addition, a persistent name may be assigned to each computing component or their corresponding peer nodes in a peer-to-peer network. In some embodiments, the persistent name may be a public key of an asymmetric encryption key pair assigned to the computing component or generated based on a known unique identifier. In some embodiments, persistent names for devices can be used in conjunction with either persistent or dynamic names for device users. In some embodiments, a persistent name for a device user can be tracked across a plurality of regions as the device user uses different devices across the plurality of regions.

Some embodiments may include one or more applications being executed on each of the computing components of a distributed computing environment that independently advertise one or more of the advertised values above. Some embodiments may include the use of one or more protocols that cause the peer nodes being executed by the distributed computing environment to advertise values to each other or a distributed application being executed by the peer nodes. For example, an embodiment can include a protocol scanner that periodically polls and causes the advertisement of a SINR and an available wireless spectrum for the base station 312, the advertisement of an available amount of RAM and available number of flops for the data center 314, and bandwidth and latency values for each of the links for the mobile switching center server 327 described with reference to FIG. 3. These values can be stored in routing tables of the computing components of the computing environment 300. Alternatively, or in addition, these values can be stored in a distributed tamper-evident ledger that can be used to record advertised performance, links in a network paths, entire network paths, computing resource utilization, etc.

Storage of any or all advertised values in a distributed, tamper-evident ledger can provide the benefit of a de-centralized system that can accommodate changes to the number of nodes in a peer-to-peer network being executed on the computing components of the distributed computing environment. Such benefits include increased responsiveness and computing adaptability to an unplanned loss in data centers, servers, or other computing components in the distributed computing environment. In addition, and as further described below, some embodiments may implement smart contracts to allow different entities to share computing services, memory, or other resources across different data centers. The smart contract can be implemented using code in a distributed application operating across two or more computing components that carries out transactions according to encoded agreements. In addition, one or more computing components of the distributed computing environment can have an IP identifier such as an IP address. Storage of IP identifiers and related values (e.g. identifiers corresponding to a letter of authorization) in a distributed, tamper-evident ledger increases the security involved in adding the one or more computing components of the distributed computing environment to an internet protocol such as the border gateway protocol (BGP). For example, by storing an advertised IP address corresponding to the data center 310 described with reference to FIG. 3 in a distributed, tamper-evident ledger and allowing both computing components of the distributed computing environment and external computing components to read the data from the distributed ledger, data center 310 can made accessible to internet-based applications via the IP address. Such changes can be made dynamic to the number of peers in the distributed computing environment, wherein the addition or subtract of servers/data centers/other computing components to the distributed computing environment can trigger updates to a distributed ledger storing identifiers for peers in the distributed computing environment.

In addition, as further explained below for block 440, use of a distributed ledger allows for the comparison of records stored in each node of the distributed ledger to determine record consistency, which can allow for the determination of whether a particular value was advertised for a computing device at a particular point in time or if a particular computing resource was available at the particular point in time. In some embodiments, a record of the inconsistency can indicate an attempt at altering the stored history of advertised values. Similarly, storage of an IP address and related values to the distributed ledger can provide the means to authenticate/verify when the computing components corresponding to the IP address were first accessible and if previous performance metrics associated with internet-accessible computing components match current performance metrics of the internet-accessible computing components. Comparison of these records with future blocks stored in the distributed ledger can be used to detect attempts at hijacking the distributed computing environment.

Some embodiments offload analysis of data from a mobile computing device in a wireless data session to a first edge-based data center, as indicated by block 402. Examples of data from the mobile computing device can include data gathered by the mobile computing device 324 about its environment with various sensors of the mobile computing device 324 as described with reference to FIG. 3. In some embodiments, the data can include captured images, depth-sensor readings, audio data, biometric data, temperature data, pressure data, etc. In some embodiments, computation based on sensor data acquired by the mobile computing device 324 may be offloaded to one or more of the edge-based data centers 310, 314, 318, or 322 via one or more of the base stations 308, 312, 316, or 320 as described for FIG. 3. For example, the offloaded computation may be performed by the edge-based data center 314 associated with the base station 312 to which the mobile computing device 324 is participating with in a wireless data session. Computation results from the edge-based data center 314 can then be transferred back to the mobile computing device 324.

In some embodiments, the request used to call a distributed API can include values such as one or more request identifiers and/or requirements. The request identifiers can include values such as a mobile computing device name, a device type, a request type, an application name, an application type, a user identifier, etc. The request requirements can include values such as a expected amount of or limit on performance metrics such as CPU percentage utilization, CPU core use, computation time request, computation time limit, memory utilization, latency, bandwidth, geolocation, velocity, physical path through a geographic area in a planned route, etc. As further described in the operations below, some embodiments can compare the one or more request values with advertised performance metric values to determine which of the available edge-based data centers are capable of and/or permitted to perform the computation caused by the request.

Some embodiments can determine whether to perform a handoff operation of a mobile computing device wireless data session from a first base station to a second base station, as indicated by block 406. Operations to perform this determination can be similar or identical to one or more operations described above for the process 50 described with reference to FIG. 2. For example, an example request can cause a distributed application like those described with reference to FIGS. 2 and 3 to determine one or more parameters of a handoff of the wireless data session from the base station 312 to the base station 308 such that the mobile computing device continues the wireless data session with the second base station 308 station after the handoff using some or all of the operations described above in the process 50. Upon determining that no handoff is needed, some embodiments may proceed to operations described for block 408 to determine if other network generation conditions are satisfied. Otherwise, upon determining to perform handoff, some embodiments may coordinate the handoff with one of the above-described distributed applications and proceed to operations described for block 410.

Some embodiments can determine whether any other network path generation conditions are satisfied, as indicated by block 408. Operation to determine whether any other network path generation conditions are satisfied may be performed using one or more computing components of a distributed computing environment or one or more computing components in communication with the distributed computing environment. For example, a network path generation condition can be determined to be satisfied by the edge-based data center 310 described with reference to FIG. 3. An example network path generation condition can include a loss of a link in the network path. For example, if a link that is part of a network path becomes inaccessible as a result of a data center outage, some embodiments can determine that a network path generation condition is satisfied. In response to a determination that the network path generation condition is satisfied, some embodiments can determine a second network path that does not includes a link to the inaccessible data center. Some embodiments can determine that a network path generation condition is satisfied if a new edge-based data center is added to the distributed computing environment. In response to a determination that the network path generation condition is satisfied because a new edge-based data center is added to the distributed computing environment, some embodiments can determine a second network path that includes a link to new edge-based data center using one or more routing methods, such as but not limited to those further described in the operations below.

Some embodiments can determine that a network path generation condition is satisfied if (e.g., in response to determining that) a computational limit has been met or exceeded. Example computational limits can include a memory limit, a computation time limit, a computation speed limit, a processor core use limit, etc. In response to a determination that the network path generation condition is satisfied because a computational limit has been met or exceeded, some embodiments can select an additional target data center to provide computations and determine a network path that includes a link to the additional target data center using one or more routing methods, such as but not limited to those further described in the operations below.

Some embodiments can determine that a network path generation condition is satisfied if an anticipated base station is determined. Some embodiments can obtain a geolocation of the mobile computing device and determine an anticipated base station that is predicted to receive data from a mobile computing device after a handoff operation. In some embodiments, the determination can be based on information provided by data transmitted from the mobile computing device. Alternatively, or in addition, the determination can be based on a predicted route of the mobile computing device and a geolocation of the mobile computing device. Using methods such as interpolation, correlation, and/or machine-learning based on the predicted route and device geolocation, some embodiments can determine an anticipated base station. In response to a determination that the network path generation condition is satisfied because an anticipated base station is determined, some embodiments can determine a network path that includes one or more links to the anticipated base station using one or more of routing methods, such as but not limited to those further described in the operations below.

Some embodiments can determine that a network path generation condition is satisfied if a recurring time condition is satisfied. For example, a distributed application an include automated instructions to determine a network path between data received by a base station to a target data center to optimize network efficiency. In response to a determination that the network path generation condition is satisfied because a recurring time condition is satisfied, some embodiments can determine a network path based on any updated advertised values corresponding to one or more edge-based data centers using one or more of the routing methods further described below. Upon a determination that no hand-off has occurred and no other network path generation conditions are satisfied, some embodiments can continue a wireless data session or return to operations described for block 401. Otherwise, some embodiments can proceed to operations described for block 410.

Some embodiments can determine whether to continue computations for the wireless data session at the first edge-based data center, as indicated by block 410. Some embodiments may change the target data center selected to perform computations caused by a request from the first edge-based data center to a different data center. Alternatively, ongoing computations based on data transmitted from a mobile computing device during a wireless data session may remain on the first edge-based data center for reasons such as performance limitations and/or application permissions. For example, with reference to FIG. 3, if data from the mobile computing device 324 is only permitted to be computed by at the edge-based data center 310 as a result of associated permissions, a handoff operation from the base station 308 to the base station 312 can result in data from the mobile computing device 324 being routed back to the edge-based data center 310 instead of being routed to the edge-based data center 314. Upon a determination that computations for the wireless data session are to continue at the first edge-based data center, some embodiments can proceed to operations described for block 412. Otherwise, some embodiments can proceed to operations described for block 414.

Some embodiments can set the first edge-based data center as the target data center of a network path, as indicated by block 412. As further described below, in some embodiments, a base station receiving data from a mobile computing device during a wireless data session can be at a first end of the network path and the first edge-based data center can be at a second end of the network path. Operation to set the first edge-based data center as the target data center of a network path may be performed using one or more computing components of a distributed computing environment or one or more computing components in communication with the distributed computing environment. For example, a network path can comprise the links from the base station 312 to the edge-based data center 322 by a distributed application being executed by the edge-based data centers 310, 314, 318, and 322 described with reference to FIG. 3. In some embodiments, setting the first edge-based data center as a target data center can be performed by calling a distributed API with a request to effect this operation. In some embodiments, this request can be considered as a request to determine a network path comprising a link to the target data center.

Some embodiments can set the second edge-based data center as the target data center of a network path, as indicated by block 414. In some embodiments, the second edge-based data center can be selected as part of an operation to move a federated cluster with a mobile computing device. Some embodiments can first determine whether computations of a candidate edge-based data center is permitted by a mobile computing device, wherein one or more identifiers of a request to determine a network path can be used to determine whether the computations are permitted. For example, a request identifier can indicate that the request is for an application associated with company "X." In response, some embodiments can determine that the edge-based data center 318 is permitted to perform calculations for applications associated with company "X" and/or that the edge-based data center 322 is not permitted to perform calculations for applications associated with company "X." Operation to set the second edge-based data center as the target data center of a network path may be performed using one or more computing components of a distributed computing environment or one or more computing components in communication with the distributed computing environment. For example, a smart contract encoded in distributed application being executed by the data centers 310, 314, 318, and 322 as described with reference to FIG. 3 can be used to set the edge-based data center 318 as target data center of a network path. In some embodiments, setting the second edge-based data center as a target data center can be performed by calling a distributed API with a request to effect this operation. In some embodiments, this request can be considered as a request to determine a network path comprising a link to the target data center.

Transferring an application state of an ongoing set of computation from a first edge-based data center to a second edge-based data center that can benefit from determining an efficient network path from the first edge-based data center to the second edge-based data center. Operations to determine a network path from the first edge-based data center to the second edge-based data center can use one or more of routing methods, such as though not limited to those described further below. As further described below, a network path having a second edge-based data center as a target data center can be used to transfer data from a first edge-based data center to a second edge-based data center.

In some embodiments, the second edge-based data center can be a previously unused or underused data center, wherein usage of the second edge-based data center may result from the implementation of a smart contract. Some embodiments may invoke the smart contract with a call to a distributed API of a distributed application that includes instructions to allocate computing resources (e.g. flops, memory, etc.) of the second edge-based data center. The invocation may be performed in response to setting the second edge-based data center as the target data center. The same smart contract or a different smart contract can be invoked to coordinate which of an available set of data centers is selected as a target data center based on advertised values available in a distributed ledger. For example, if the data center 314 described with reference to FIG. 3 had insufficient computing resources to compute results for data from the mobile computing device 324 for a particular application, a smart contract can be used to settle on the data center 310 as the target data center based on the data center 310 having a sufficient amount of memory. The smart contract can then be used to negotiate a transaction that allows the use of data center 310. Subsequently, the smart contract can store a fee or a data center utilization correlated with the fee in a distributed, tamper-evident ledger, wherein the fee may be charged to an entity owning the particular application or device that invoked the smart contract or caused the computation at the second data center.

Some embodiments include calling the distributed API of the distributed application with a request to determine a network path comprising a link to the target data center, as indicated by block 418. Operation to call the distributed API of the distributed application with a request to determine a network path can be performed by computing components of a distributed computing environment or computing components in communication with the distributed computing environment. For example, the edge-based data center 314 can call the distributed API of a distributed application being executed on the edge-based data centers 310, 314, 318, and 322 described with reference to FIG. 3. In some embodiments, the call may be initiated by the distributed application itself, a data center, a mobile computing device, a base station, an external application, etc. In some embodiments, the distributed API called may include an identifier, such as a public cryptographic key that serves as an identifier of the target data center. In some cases the call may include parameters by which a network path to the target data center may be determined, wherein the parameters may include advertised performance metric values, other data center values, and/or computation requirements. In some embodiments, the call to the distributed API may be routed via one of the above-described DHT to one or more of the computing devices in the peer-to-peer distributed computing environment described above. In some embodiments, every peer node on a DHT (or a sharded subset of peer nodes) may execute the code of a smart contract invoked by the distributed API call. The peer nodes that evaluate the smart contract may determine a response to the API call based on distributed consensus algorithms. Thus, some embodiments may be robust to untrusted peer compute nodes.

Some embodiments can determine a network path based on the advertised performance metric values, as indicated by block 420. The network path can include links to and from a target data center. Some embodiments can determine a network path from a base station to an edge-based data center. In addition, or alternatively, some embodiments can determine a network path from the first edge-based data center to the second edge-based data center. Operation to determine a network path may be performed by computing components of a distributed computing environment or computing components in communication with the distributed computing environment. For example, a network path may be determined using an application being executed by the edge-based data center 310 described with reference to FIG. 3.

Some embodiments can use one or more request requirements in conjunction with advertised performance metric values to filter out possible links or possible network paths. Some embodiments can also use the one or more request requirements to indicate possible performance decreases. Direct comparisons between a set of request requirements and performance metric values can be used to determine which of a set of performance metric values satisfy the set of request requirements. Some embodiments can filter out edge-based data centers or network links that do not satisfy one or more of the request requirements. For example, the request can include a first request requirement of a maximum average latency limit of 50 milliseconds and a second request requirement of a minimum bandwidth of 20 megabits per second. In response, the distributed application can select a first link having an average latency of 45 milliseconds with a bandwidth of 21 megabits per second to be part of a network path instead of a second link having an average latency of 10 milliseconds with a bandwidth of 19 megabits per second due to the second link not meeting both request requirements. Alternatively, instead of filtering out links from consideration during network path generation, some embodiments can determine that a request requirement is not fulfilled by the determined network path and transmit an indicator signal that indicates that an application using data being transferred through the determined network path may suffer from a performance decrease.

Some embodiments can determine a network path using a routing algorithm based on a plurality of performance metric values. In some embodiments, a network path can be determined using a direct comparison of performance metric values or a comparison of function outputs based on the performance metric values. For example, some embodiments can use a method similar to a path vector protocol such as the border gate protocol (BGP) to determine a network path. Implementation of a protocol similar to the path vector protocol can include using the computing components in a distributed computing environment to play a role similar to the role played by autonomous system boundary routers (ASBRs) used for the BGP. The computing components can advertise performance metric values that include or are otherwise correlated with the reachability of other elements in a distributed computing environment. The advertised performance metric values can be stored in a tamper-evident, distributed ledger encoding records of a plurality of previous advertised values in a directed acyclic graph of cryptographic hash pointers.

Any or all of the peer computing nodes of peer-to-peer network being executed by a distributed computing environment executing a distributed application can verify the advertised values by comparing them with their own respective stored records. For example, an advertised value for a first computing component can be accompanied with a public cryptographic key associated with a second computing component or a node corresponding with the second computing component, wherein the advertised value can be accepted or rejected based on a match with a private cryptographic key. In addition, each computing component can verify the links of a network path according to one or more router policies. For example, the mobile switching center server 327 can verify that advertised values corresponding to a link to the mobile switching center server 328 satisfy a router policy comprising a latency threshold, bandwidth threshold, required connectivity to an IP address corresponding with a validated letter of authorization, etc.

Storage of a network path, links in the network path, or related information in the distributed ledger can be used to provide evidence of tampering in the event that a malicious, unauthorized, or otherwise unscheduled link is added to the distributed computing environment. Upon successful verification of a particular advertised value and a link corresponding to the particular advertised value, one or more computer elements may advertise one or more additional values to the distributed ledger and modify their corresponding routing tables to reflect which network paths have a shortest distance to a target data center. Some embodiments may calculate the shortest distance by comparing/connecting the links of network paths or link combinations. Some embodiments can also determine a network path based on which of a candidate set of network paths has a greatest corresponding local preference attribute or router-specific weight value. In addition, some embodiments can store the routing tables or their recorded network paths (either in its entirety or as one or more links corresponding to a particular node in the network path) in either the same distributed ledger used to for the advertised values or a different distributed ledger, which may be accessible to the peer-to-peer network executed by the distributed computing environment.

Some embodiments may use a distance vector routing protocol, wherein the network path is determined based on a least corresponding distance, and wherein the distance can be measured by the number of routers (e.g. nodes/servers) that a packet passes along the network path. Some embodiments may store the network path and corresponding distance in a routing table corresponding to each router, wherein routers may exchange information with each other to update their respective routing tables. For example, if the edge-based data center 318 of FIG. 3 is a target data center, a distributed application being executed on the edge-based data centers 310, 314, 318, and 322 can include and use a network path stored in the routing table as the determined network path, wherein the network path can hop across the mobile switching center servers 327 and 328 before arriving at the edge-based data center 318. Similar to the methods described above, identifiers and performance metric values for computing elements in the distributed computing environment can be stored in a distributed, tamper-evident ledger, which can then be referenced to determine the network path.

Some embodiments can use a link state routing protocol, such as an open shortest path first (OSPF) protocol. An application can implement the link-state routing protocol by constructing a graph of network connectivity based on a topology of a network of the distributed computing environment. Some embodiments can include the use of a distributed application to determine the connectivity of each router and corresponding link-state information based on the values advertised to the distributed application. In some embodiments, the link-state values can be advertised and stored in a distributed ledger. For example, the values corresponding to the data centers 310, 314, 318, and 322 and the mobile switching center servers 326-328 can be advertised to and stored on a blockchain executed on the peer compute nodes 332 described with reference to FIG. 3. The distributed application can then determine a graph of the distributed computing environment based on the advertised link-state values. Each server or connected computing component (e.g. a connected data center) may then determine the shortest network path from itself to other routers in the network using one or more various algorithms, such as Dijkstra's algorithm, and fill a routing table corresponding to the router with each of the shortest network paths.

Some embodiments can use an implementation of a backpressure algorithm as the routing algorithm to determine the network path. As depicted in FIG. 3, the mobile computing device 324 can transmit mobile data comprising an application identifier and set of requirements to the base station 312, wherein the mobile data can include a request to determine a network path or be used produce the request to determine the network path. The request can be sent to a distributed application executing on peer nodes via a distributed API, wherein the request can cause ongoing computations to be continue being performed at the edge-based data center 322. In response to the request, the distributed application can analyze each of a set of bandwidth values advertised to the peer network to determine a network path to the edge-based data center 322 from the base station 312. As a part of generating the network path, the distributed application can determine data commodity values for each link in the distributed computing environment. For example, some embodiments can determine data commodity values based on the number of packets to be transferred from the edge-based data center 314 and the bandwidth of a first link from the edge-based data center 310 to the edge-based data center 322 and a second link from the edge-based data center 318 to the edge-based data center 322. Based on the data commodity values, some embodiments can determine a data transfer matrix and transfer data packets through a network path at rates determined based on the data commodity values and the data transfer matrix.

Some embodiments can use implementations of other routing methods that can be based on one or more of the performance metrics described above. Routing methods can include one or more implementations of a global routing algorithm such as Dijkstra's algorithm or Prim's algorithm, wherein the cost of each link can be based on advertised latency values and/or advertised bandwidth values between links in the distributed computing environment. Alternatively, some embodiments can use a decentralized routing method such as an implementation of a distance-vector routing algorithm. Other example routing methods can include methods based on shortest path computations or network flooding, such as Ad Hoc on-Demand Distance Vector Routing (AODV), geographic routing, and extremely opportunistic routing (ExOR). In addition, a routing method can include using pre-specified paths, include biases along certain links, and the use of last-in-first-out services to decrease packet delays.

Some embodiments can use one or more routing methods to provide multipath routing (e.g. multipath TCP routing) and determine a plurality of paths from an initial base station to a target data center. For example, a request can specify that packets transmitted from the mobile computing device 324 to the base station 312 be transmitted through a plurality of network paths. In response, the system can determine a plurality of paths by using different routing algorithms, and/or using different initial conditions/parameters (e.g. different link biases, different pre-selected paths, etc.,) when generating the plurality of network paths that share the same ends. For example, some embodiments can determine a first network path from the edge-based data center 314 to the edge-based data center 322 via the edge-based data center 310 and a second network path from the edge-based data center 314 to the edge-based data center 322 via the edge-based data center 318. In addition, some embodiments can use one or more routing algorithms to determine a plurality of paths from a signal-receiving base station to a plurality of edge-based data centers to cause computations to occur at the plurality of edge-based data centers. For example, a request can specify that data transmitted from the mobile computing device 324 to the base station 312 can be transmitted to a plurality of target data centers. In response, the distributed application can determine a first network path from the edge-based data center 314 to the edge-based data center 310 and a second network path from the edge-based data center 314 to the edge-based data center 318.

Some embodiments can determine a second network path based on a second request received by a distributed API after a first request is received, wherein at least one of the request values of the second request are different from the first request. For example, with reference to FIG. 3, the mobile computing device 324 can transmit a first set of data to the base station 312 that results in the generation of a first request, wherein the first request causes computations to occur at the edge-based data center 322 and generation of a first network path linked to the edge-based data center 322. The mobile computing device 324 can then transmit a second set of data to the base station 312 that results in the generation of a second request, wherein the second request causes computations to occur at the edge-based data center 318 and generation of a second network path linked to the edge-based data center 318. Some embodiments can then transfer data packets from each of the edge-based data centers 318 and 322 to the mobile computing device 324.

After generating the network path, some embodiments can transfer data packets along the network path, as indicated by block 430. Operation to transfer data packets along the network path may be performed using one or more computing components of a distributed computing environment or one or more computing components in communication with the distributed computing environment. For example, a network path may be determined using a distributed application being executed by the edge-based data centers 310, 314,318, and 322 described with reference to FIG. 3. Some embodiment can transfer data packets either unidirectionally or bidirectionally between a base station to an edge-based data center. Some embodiments can transfer data either unidirectionally or bidirectionally between a first edge-based data center and a second edge-based data center. For example, with reference to FIG. 3, an example network path can comprise the links from the edge-based data center 322 to the edge-based data center 310 and the link from the edge-based data center 310 to the base station 308, and a packet can be transferred from the edge-based data center 310 to the base station 308 along the example network path.

Some embodiments may invoke a smart contract implemented on the blockchain of a distributed application being executed on a distributed computing environment. either during or after the transfer of a data packet along the network path. Some embodiments may invoke the smart contract in response to a use of a computing component performing computations based on data from a mobile device. In some cases, the smart contract may encode a set of criteria by which an entity negotiates and commit to a charge in return for use of the target data center or for the use of one or more links in the network path, wherein the entity may be represented by an identifier such as indicated a device identifier, application identifier, entity-owned data center identifier, etc. In some cases, the smart contract may be memorialized within the blockchain, along with offers, counter offers, and acceptance algorithmically submitted to the block-chain ledger. In some embodiments, these operations may be performed by a smart contract executing on ad hoc peer-to-peer distributed computing applications on peer compute nodes 332 described with reference to FIG. 3.

Some embodiments store a record of data center use in a tamper-evident, distributed ledger encoding records of a plurality of previous data center utilization in a directed acyclic graph of cryptographic hash pointers, as indicated by block 440. Operation to store a record of data center use in a tamper-evident, distributed ledger may be performed using one or more computing components of a distributed computing environment or one or more computing components in communication with the distributed computing environment. For example, a record of data center use may be stored in a tamper-evident, distributed ledger using a distributed application being executed by the edge-based data centers 310, 314, 318, and 322 described with reference to FIG. 3. In some embodiments, the cryptographic hash pointers may include a plurality of blocks arranged in a chain, with each block including a cryptographic hash pointer to a previous block, and the blocks arranged sequentially in an order of creation. Similar to the blocks described above, each block may include a Merkel tree, e.g., a Radix tree. In some embodiments, each cryptographic hash pointer may include a cryptographic hash value determined by a cryptographic hash function. In some embodiments, the cryptographic hash values may be based on a content of a node, or a plurality of nodes, to which the cryptographic hash pointer point, and content of each node may include its respective cryptographic hash pointer hash values.

Records of data center utilization can include or otherwise indicate one or more values such as a data center identifier, a time of data center utilization, a utilization duration, a number of cores used, an amount of memory used, etc. In addition, some embodiments can include storing a record of other information in acyclic graphs. For example, some embodiments can include storing a representation of the network path, the base station used to receive sensor signals and/or other data from the mobile computing device, and/or a spatial position of the mobile computing device position in a tamper-evident, distributed ledger encoding records of a plurality of previous values in a directed acyclic graph of cryptographic hash pointers.

Storage of any or all advertised values or data center utilization in a distributed, tamper-evident ledger, in some implementations, allows for subsequent record interrogation, which can reveal evidence of record-tampering and/or other malicious activity. For example, a first peer node of a peer-to-peer network being executed on a distributed computing environment can record a first block at a first time point in its local version of the blockchain corresponding with the distributed ledger, wherein the first block includes a record of a data center utilization value of 1000 cpu-hours for the data center 310 described with referenced to FIG. 3. The hash of this first block can be compared with the hash of a second block, wherein the second block is stored in a local version of the blockchain of a second node that corresponds with the distributed ledger. This comparison may allow the determination of whether or not the first block has been tampered with, wherein mismatched hash values can provide evidence of tampering. By performing such verifications across the various nodes of a distributed ledger, an original, untampered version can be restored by recomputing the values of the distributed ledger from a time point determined to be before tampering had occurred. Inclusion of such methods can prevent the theft of computing resources by unauthorized computing devices and/or inefficient resource allocation in a data center.

Figure 5:
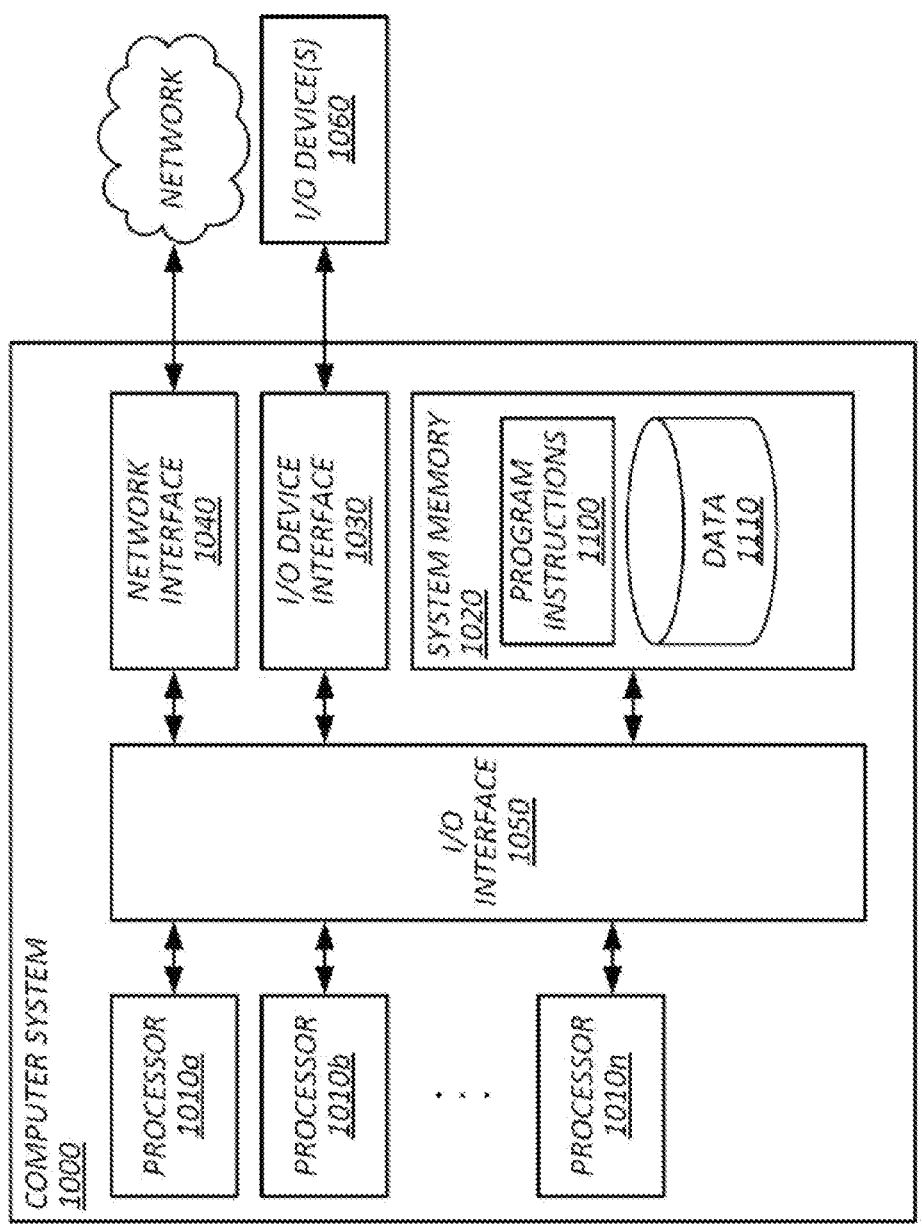
FIG. 5 is an example of a computing environment in which the present techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a unit-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-infirst-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), an augmented reality device, a biomedical device, or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: advertising, with a computer system, a plurality of values corresponding to computing components to peer nodes of a peer-to-peer network; storing, with the computer system, the plurality of values in a tamper-evident, distributed ledger encoding records of a plurality of previous values in a directed acyclic graph of cryptographic hash pointers, wherein the tamper-evident, distributed ledger is stored on the peer-to-peer network; determining, with the computer system, a target data center in the distributed computing environment, wherein the target data center performs computations based on data sent from a mobile computing device, and wherein the target data center executes a peer node of the peer-to-peer network; determining, with the computer system, a network path that is linked to the target data center based on a distance to the target data center, wherein the distance value is determined based on from the plurality of values stored in the tamper-evident, distributed ledger; and transferring, with the computer system, a packet from the target data center, wherein the packet traverses the network path and comprises one or more computation results from the target data center.

2. The medium of embodiment 1, wherein: the peer-to-peer network is an ad hoc peer-to-peer network of untrusted computing devices; a plurality of peers on the peer-to-peer network are identified by a unique identifier based on a respective public key of an asymmetric encryption protocol; and wherein at least one link in the network path is authenticated by peers cryptographically signing a message with a private cryptographic key corresponding to the public cryptographic key; and a routing table accessible to the peer-to-peer network stores the link of the network path.

3. The medium of any one of embodiment 1 or 2, further comprising storing a target data center identifier and a measure of utilization of the target data center in the tamper-evident, distributed ledger.

4. The medium of embodiment 3, wherein the operations further comprise calling a distributed application program interface (API) with an invocation of a smart contract on the peer-to-peer network, wherein operations to execute the smart contract comprise: storing an entity identifier associated with an entity causing an invocation of the distributed API; and wherein the entity identifier is associated with the utilization of the target data center.

5. The medium of any one of embodiments 1-4, wherein the operations further comprise determining whether the distributed, tamper-evident ledger shows evidence of tampering based on a comparison of a hash value stored in a first block with a hash value stored in a second block, wherein the first block corresponds with a first time point stored in a local version of a blockchain of a first peer computing node, and wherein the second block corresponds with a second time point stored in a local version of a blockchain of a second peer computing node.

6. The medium of any one of embodiments 1-5, wherein the operations to determine the target data center comprise: invoking a smart contract being executed on the peer-to-peer network, wherein a criterion encoded in the smart contract comprises at least one of a latency threshold or a bandwidth threshold; performing a comparison of a performance metric value stored in the distributed, tamper-evident ledger with the criterion; and selecting the data center corresponding with the performance metric value as the target data center.

7. The medium of any one of embodiments 1-6, the operations further comprising: a distributed application being executed on the peer-to-peer network determines one or more parameters of a handoff of a wireless data session from a first base station to a second base station such that the mobile computing device continues the wireless data session with the second base station after the handoff; a first data center hosting peer nodes in the peer-to-peer network is used to compute results based on data from the mobile computing device before the handoff; the operations further comprise determining that the first data center is used to compute results based on data from the mobile computing device after the handoff; and the second base station is at a first end of the network path and the first data center is at a second end of the network path.

8. The medium of any one of embodiments 1-7, wherein: a distributed application being executed on the peer-to-peer network determines one or more parameters of a handoff of a wireless data session from a first base station to a second base station such that the mobile computing device continues the wireless data session with the second base station after the handoff; a first data center hosting peer nodes in the peer-to-peer network is used to compute results based on data from the mobile computing device before the handoff and a second data center hosting peer nodes in the peer-to-peer network is used to compute results based on data from the mobile computing device after the handoff; the first data center is at a first end of the network path and the second data center is at a second end of the network path; and the operations further comprise transferring program state for a dynamic federated cluster that moves with the mobile computing device onto the second data center.

9. The medium of any one of embodiments 1-8, wherein the plurality of values comprise at least one of an encoding, available bandwidth, broadcast range or strength, available wireless spectrum, quality of service, signal-to-noise-ratio, signal-to-interference-plus-noise ratio, system temperature, cooling equipment status, available number of flops, available amount of random access memory, number of linked computing components, or identifier of a linked computing component.

10. The medium of any one of embodiments 1-9, wherein generating the network path comprises using multipath routing to determine a plurality of network paths, wherein each of the plurality of network paths share a first end and a second end.

11. The medium of any one of embodiments 1-10, wherein the network path is a first network path, and wherein the operations further comprise: determining an anticipated base station that is predicted to receive signals the mobile computing device based on a geolocation of the mobile computing device; and generating a second network path, wherein the second network path includes a link to the anticipated base station.

12. The medium of any one of embodiments 1-11, wherein the operations further comprise: determining that a computation based on data from the mobile computing device is permitted by a candidate data center is based on an identifier communicated by a request; and setting the candidate data center as the target data center.

13. The medium of any one of embodiments 1-12, the operations comprising: obtaining, with one or more processors, a distributed-application address of a distributed application being executed on the peer-to-peer network, wherein the distributed-application address is a cryptographic hash value that uniquely identifies the distributed application among a plurality of distributed applications executable on the peer nodes, and wherein the distributed application is accessible via one or more of the peer nodes identified by entries in a distributed hash table linked to a key value in the distributed hash table corresponding to the distributed-application address; and calling a distributed application program interface of the distributed application with a request to generate the network path.

14. The medium of any one of embodiments 1-13, the wherein the operations further comprise: determining that a link in the network path has become inaccessible; and in response to this determination, generating a second network path that does not include the inaccessible link.

15. The medium of any one of embodiments 1-14, wherein the network path is a first network path, and wherein the target data center is a first target data center, and wherein the operations further comprise: receiving a request based on additional data gathered by the mobile computing device, wherein a second target data center provides computations for the additional data, wherein the second target data center is different from the first target data center; generating a second network path based on the request; and transferring at least one packet from the second target data center to the mobile computing device via the second network path.

16. The medium of any one of embodiments 1-15, wherein the operations further comprise: determining that no network path is available to meet a requirement of a request to determine a network path; and determining the network path based on a comparison between a first cost and a second cost, wherein the first cost is based on a first performance metric value, and wherein the second cost is based on a second performance metric value, and wherein the first performance metric value and the second performance metric value are both part of the plurality of values stored in the distributed, tamper-evident ledger.

17. The medium of any one of embodiments 1-16, wherein the operations further comprise generating an indicator signal and transmitting the indicator signal to the mobile computing device, wherein the indicator signal indicates a performance decrease.

18. The medium of any one of embodiments 1-17, wherein the network path is a first network path, and wherein the target data center is a first target data center, and wherein the operations further comprise: determining that a computational limit of the first target data center of the network path is exceeded by a set of computations being performed by the first target data center; selecting a second target data center to perform computations based on the computational limit being exceeded; and generating a second network path, wherein the second network path includes a link to the second target data center.

19. A method, comprising: the operations of any one of embodiments 1-18.

20. A system, comprising: one or more processors; and memory storing instructions that when executed by the processors cause the processors to effectuate operations comprising: the operations of any one of embodiments 1-18.

What is claimed is:

1. A computer-implemented method of locally cross-connecting networks in edge-computing environments, the method comprising:
receiving, at a first cellular base station co-located with a first edge-based data center, a request for edge-based computing from a mobile computing device, wherein:
the request is received on a first network including a plurality of other geographically-distributed cellular base stations in a metropolitan area,
the request is sent wirelessly from the first mobile computing device to the first cellular base station, and
the first edge-based data center is on a second network of a plurality of geographically-distributed edge-based data centers, including the first edge-based data center, in the metropolitan area;
cross-connecting, at the first edge-based data center, the first network to the second network by operation of software executed at the first edge-based data center and determining a path on the second network to computing resources at the first edge-based data center;
determining, with the first edge-based data center, a path on the second network to computing resources to service the request at one of the plurality of geographically-distributed edge-based data centers; and
causing the request to be conveyed via the path to the computing resources.

2. The method of claim 1, wherein:
cross-connecting is performed without requiring the request be sent to a mobile switching center of the first network.

3. The method of claim 1, wherein:
determining the path is performed without requiring the request be sent to a mobile switching center of the first network.

4. The method of claim 1, wherein determining the path comprises selecting one of the plurality of edge-based centers to service the request.

5. The method of claim 4, wherein selecting one of the plurality of edge-based centers comprises:
obtaining, at the first edge-based data center, telemetry of the plurality of edge-based data centers;
selecting, at the first edge-based data center, the selected one of the plurality of edge-based centers.

6. The method of claim 5, wherein obtaining telemetry comprises each of the plurality of edge-based data centers advertising performance metric values.

7. The method of claim 6, wherein obtaining telemetry comprises steps for advertising performance metric values.

8. The method of claim 4, wherein selecting one of the plurality of edge-based centers comprises selecting a second edge-based data center among the plurality of edge-based data centers.

9. The method of claim 4, wherein selecting one of the plurality of edge-based centers comprises:
obtaining, at the first edge-based data center:
first values indicative of processor utilization of other edge-based data centers among the plurality of edge-based data centers, and
second values indicative of memory utilization of other edge-based data centers among the plurality of edge-based data centers; and
selecting based on the first values and the second values.

10. The method of claim 4, wherein selecting one of the plurality of edge-based centers comprises selecting based on a measure of expected latency in at least part of servicing the request.

11. The method of claim 1, wherein the second network is a backhaul network.

12. The method of claim 1, wherein the second network is a crosshaul network.

13. The method of claim 1, wherein cross-connecting comprises cross-connecting in real-time by reconfiguring the path in response to a real-time event.

14. The method of claim 1, comprising:
advertising performance metric values; and
rendering at least some of the advertised performance metric values tamper evident with a tamper-evident data structure.

15. The method of claim 1, comprising:
effectuating the cross-connecting with a smart contract configured to write a record documenting the cross-connecting to a directed acyclic graph of cryptographic hash pointers.

16. The method of claim 1, comprising:
servicing a first part of a workload at least partially specified by the request at the first edge-based data center; and
servicing a second part of the workload at a second edge-based data center among the plurality of edge-based data centers.

17. The method of claim 1, wherein:
determining the path comprises steps for determining the path.

18. The method of claim 1, comprising:
performing steps for determining new network paths.

19. The method of claim 1, comprising:
servicing the request with a distributed application executed on more than one of the plurality of edge-based data centers.

20. A tangible, non-transitory, machine-readable medium storing instructions that when executed by a computer system effectuate operations comprising:
receiving, at a first cellular base station co-located with a first edge-based data center, a request for edge-based computing from a mobile computing device, wherein:
the request is received on a first network including a plurality of other geographically-distributed cellular base stations in a metropolitan area,
the request is sent wirelessly from the first mobile computing device to the first cellular base station, and
the first edge-based data center is on a second network of a plurality of geographically-distributed edge-based data centers, including the first edge-based data center, in the metropolitan area;
cross-connecting, at the first edge-based data center, the first network to the second network by operation of software executed at the first edge-based data center and determining a path on the second network to computing resources at the first edge-based data center;
determining, with the first edge-based data center, a path on the second network to computing resources to service the request at one of the plurality of geographically-distributed edge-based data centers; and
causing the request to be conveyed via the path to the computing resources.

21. The medium of claim 20, wherein:
cross-connecting is performed without requiring the request be sent to a mobile switching center of the first network.

22. The medium of claim 20, wherein:
determining the path is performed without requiring the request be sent to a mobile switching center of the first network.

23. The medium of claim 20, wherein determining the path comprises selecting one of the plurality of edge-based centers to service the request.

24. The medium of claim 23, wherein selecting one of the plurality of edge-based centers comprises:
obtaining, at the first edge-based data center, telemetry of the plurality of edge-based data centers;
selecting, at the first edge-based data center, the selected one of the plurality of edge-based centers.

25. The medium of claim 24, wherein obtaining telemetry comprises each of the plurality of edge-based data centers advertising performance metric values.

26. The medium of claim 25, wherein obtaining telemetry comprises steps for advertising performance metric values.

27. The medium of claim 23, wherein selecting one of the plurality of edge-based centers comprises selecting a second edge-based data center among the plurality of edge-based data centers.

28. The medium of claim 23, wherein selecting one of the plurality of edge-based centers comprises:
obtaining, at the first edge-based data center:
first values indicative of processor utilization of other edge-based data centers among the plurality of edge-based data centers, and
second values indicative of memory utilization of other edge-based data centers among the plurality of edge-based data centers; and
selecting based on the first values and the second values.

29. The medium of claim 23, wherein selecting one of the plurality of edge-based centers comprises selecting based on a measure of expected latency in at least part of servicing the request.

30. The medium of claim 20, wherein the second network is a backhaul network.

31. The medium of claim 20, wherein the second network is a crosshaul network.

32. The medium of claim 20, wherein cross-connecting comprises cross-connecting in real-time by reconfiguring the path in response to a real-time event.

33. The medium of claim 20, the operations further comprising:
advertising performance metric values; and
rendering at least some of the advertised performance metric values tamper evident with a tamper-evident data structure.

34. The medium of claim 20, the operations further comprising:
effectuating the cross-connecting with a smart contract configured to write a record documenting the cross-connecting to a directed acyclic graph of cryptographic hash pointers.

35. The medium of claim 20, the operations further comprising:
servicing a first part of a workload at least partially specified by the request at the first edge-based data center; and
servicing a second part of the workload at a second edge-based data center among the plurality of edge-based data centers.

36. The medium of claim 20, wherein:
determining the path comprises steps for determining the path.

37. The medium of claim 20, the operations further comprising:
performing steps for determining new network paths.

38. The medium of claim 20, the operations further comprising:
servicing the request with a distributed application executed on more than one of the plurality of edge-based data centers.

* * * * *